(12) United States Patent
Kamihira et al.

(10) Patent No.: US 6,324,529 B1
(45) Date of Patent: Nov. 27, 2001

(54) EVOLUTIONARY CONTROLLING SYSTEM

(75) Inventors: Ichikai Kamihira; Masashi Yamaguchi, both of Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 09/317,905

(22) Filed: May 24, 1999

Related U.S. Application Data

(63) Continuation-in-part of application No. 09/159,836, filed on Sep. 24, 1998, which is a continuation-in-part of application No. 08/939,132, filed on Sep. 29, 1997.

(30) Foreign Application Priority Data

Sep. 27, 1996 (JP) ......................................... 257000
Sep. 29, 1997 (JP) ...................................... 9-264604

(51) Int. Cl.[7] .................................................. G06F 9/445
(52) U.S. Cl. ................................................................ 706/13
(58) Field of Search ................................... 706/13, 59, 2; 701/106

(56) References Cited

U.S. PATENT DOCUMENTS

| | | | |
|---|---|---|---|
| 5,701,400 | * 12/1997 | Amado | 706/45 |
| 5,761,384 | * 6/1998 | Inoue | 706/2 |
| 5,819,242 | * 10/1998 | Matsuoka et al. | 706/2 |
| 5,841,949 | * 11/1999 | Nakaya et al. | 706/59 |
| 6,032,139 | * 2/2000 | Yamaguchi et al. | 706/13 |
| 6,064,996 | * 5/2000 | Yamaguchi et al. | 706/13 |
| 6,216,083 | * 4/2001 | Ulyanov et al. | 706/106 |

FOREIGN PATENT DOCUMENTS

0959414A1 * 11/1999 (JP) ................................ G06F/15/80
0962871A2 * 12/1999 (JP) ................................ G06F/15/80

OTHER PUBLICATIONS

Apple Advanced Technology Group, Vivarium Program, Artificial Life II Conference Report by Larry Yaeger, (Feb. 5th through 9th, 1990) Sweeney Center, Santa Fe, New Mexico.*

Artificial Evolution: A Neww Path for Artificial Intelligence? P. Husbands, I. Harvey, D. Cliff, and G. Miller (Brain and Cognition 34, 130–159 (1997) Article No. BR970910).*

The Hitch–Hiker's Guide to Evolujtionary Computation (FAQ for comp.ai.genetic) by Jorg Heitkotter and David Beasley (1997).*

The design of natural and artificial adaptive systems, Frank, S. A. (1996) pp. 451–505, in Adaption, M. R. Rose and G. V. Lauder, eds. Academic Press, New York.*

* cited by examiner

Primary Examiner—Mark R. Powell
Assistant Examiner—Michael B. Holmes
(74) Attorney, Agent, or Firm—Knobbe, Martens, Olson & Bear, LLP

(57) ABSTRACT

An evolutionary control for a subject such as an engine installed in a vehicle is conducted by the steps of: selecting coefficients, as genes, affecting the control characteristics of the control system; creating plural control units as chromosomes, each being constituted by plural genes; expressing the genes of each chromosome as control characteristics by controlling the subject using the control system having the control characteristics; selecting at least one chromosome from the created chromosomes based on the control characteristics expressed by the genes in view of the user's preference; and causing the at least one chromosome to evolve using a genetic algorithm, thereby obtaining control characteristics suitable to the user. In this method, the characteristics of the product can effectively be adjusted after its purchase based on the user's preference.

7 Claims, 21 Drawing Sheets

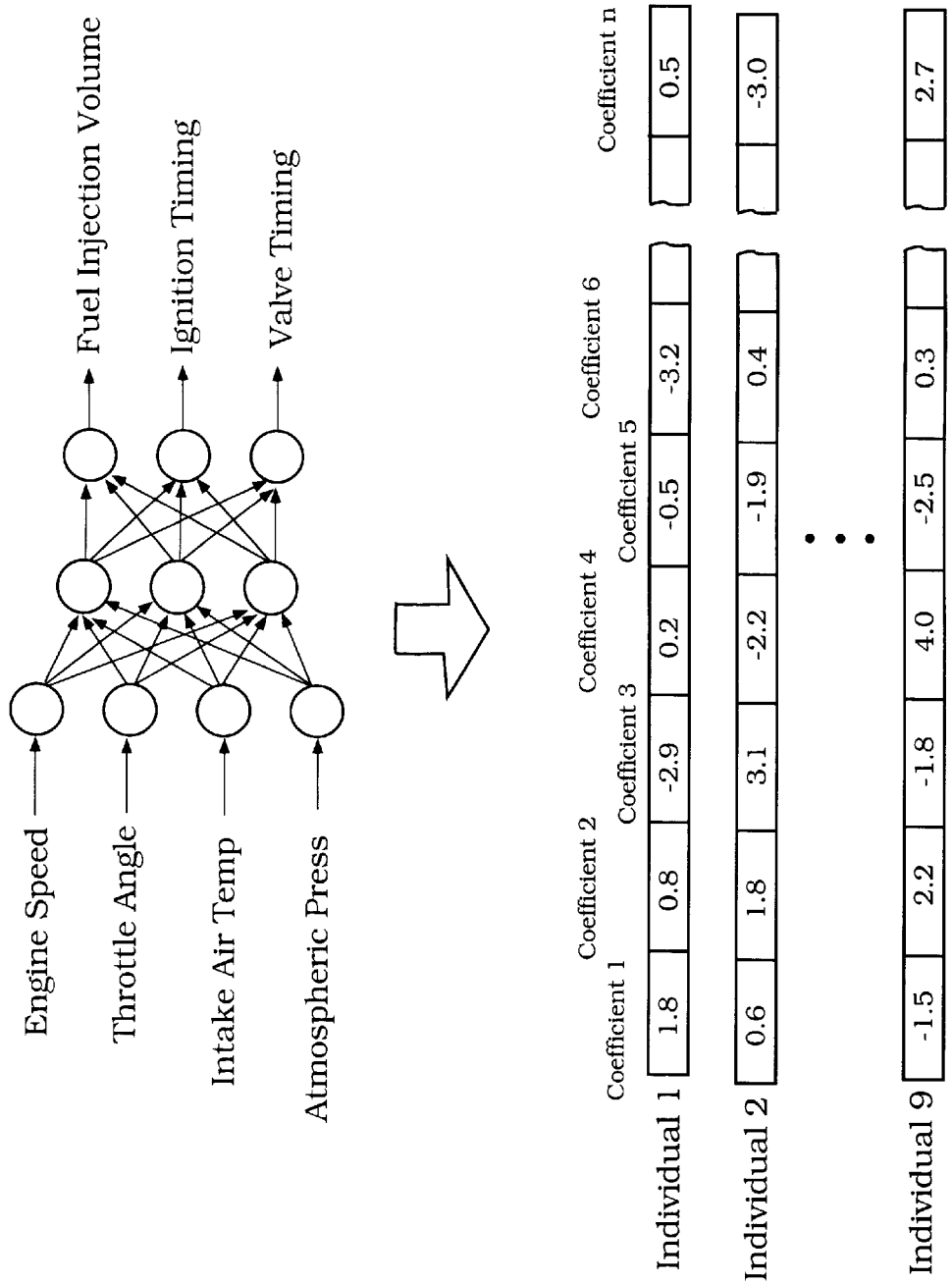

Torque is high at low-medium speed but not at high speed, and fuel efficiency is low.

High-speed torque
Medium-speed torque
Low-speed torque

Fuel efficiency is very good; but torque is low at all speeds.

Both torque and fuel efficiency are reasonable.

EVOLUTIONARY CONTROLLING SYSTEM

The present application is a continuation-in-part of application Ser. No. 08/939,132, filed Sep. 29, 1997, and Ser. No. 09/159,836, filed Sep. 24, 1998. The disclosure of these previous applications is hereby incorporated herein in its entirety by this reference thereto.

BACKGROUND OF THE INVENTION

1. Field of the Invention

This invention relates to an evolutionary controlling system, and particularly to that for controlling characteristics of a subject in an evolutionary manner.

2. Description of Related Art

Heretofore, when a control system or control characteristics of a subject, such as vehicles and electrical appliances, is designed, imaginary users are selected, and the users' preferences and their using conditions are taken into consideration. The characteristics of the subject are determined in such a way as to adapt the subject to users in as broad a range as possible.

However, each individual user has a particular and unique personality, and thus, their preferences are diverse. Thus, there is a problem in that even if imaginary users are selected to develop and design a product for users by presuming the users' preference, it is impossible to satisfy all of the users of the product.

In order to solve the above problem, prior to purchase of a product, a prospective user is requested to determine whether or not the product is satisfactory to the user after checking the characteristics of the product in light of the user's preferences. However, it is troublesome for the user to check the characteristics of the product before purchase. Further, because a series of products are often operated or controlled by characteristics common in the products, although the design of the product is changed depending on the user's preferences, the user may not like other operational characteristics. Thus, although the design is appealing to some prospective users, the users may not purchase the product since the operational characteristics do not appeal to them. In other words, there is another problem in that the range of users is limited and depends on the operational characteristics.

An objective of the present invention is to provide an evolutionary control system to construct characteristics which can satisfy plural users.

SUMMARY OF THE INVENTION

One important aspect of the present invention includes a method for controlling performance of a machine used by a user, which machine is operable by causative signals, the performance of which machine is indicatable by indicative signals. In the above, the machine is controlled by a control system comprising: (I) a control module programmed to output the causative signals when receiving per-selected signals, wherein the input-output relationship of the control module is regulated by coefficients; and (II) a genetic algorithm unit programmed to select fitted coefficients based a selection signal when using coefficients as genes, wherein the selected fitted coefficients replace the coefficients used in the control module to update its input-output relationship. One embodiment of the method of the present invention comprises the steps of: (a) outputting the causative signals from the control module to the machine when the control module receives per-selected signals; (b) selecting a selection signal from the group consisting of: (i) a selection signal inputted directly by the user in response to the performance of the machine based on its indicative signals; (ii) a selection signal expressed numerically by analyzing the user's reaction to the performance of the machine based on its indicative signals; and (iii) a pre-set target value; (c) selecting fitted coefficients by the genetic algorithm unit based on the selected selection signal; and (d) replacing the coefficients used in the control module to update its input-output relationship to control the machine. One practical example can be found in a vehicle engine wherein fuel efficiency can be improved autonomously (by using the pre-set target value as a selection signal) whereas drivability can be improved in accordance with the user's response (by using the direct selection signal or the user response signal), thereby improving integrally the performance of the engine. FIG. 1 is a schematic diagram illustrating embodiments of the method including the above.

As shown in FIG. 1, the method can further comprise, prior to step (a), inputting the causative signals from the control module to a computer simulation model by bypassing the machine, said simulation model programmed to simulate the performance of the machine, wherein steps (a) through (d) are conducted using the simulation model. The control module may include a neural network, the input-output relationship of which is regulated by coupling coefficients, said coupling coefficients being used as genes at the genetic algorithm units. In another embodiment, the control module constitutes an evolution layer, and the control system further comprises a base layer downstream of the evolution layer and upstream of the machine. In the above, the method further comprises calculating and adding, by the base layer, base values of the causative signals to the outputs from the control modules of the evolution layer, based on pre-selected signals. The base layer is not indispensable, but advantageous in preventing surges of the causative signal and stabilizing the performance. The base layer can be a conventional control module which constantly outputs signals based on calculation.

In anther embodiment, the method further comprises a learning layer between the evolution layer and the base layer, said learning layer having a learning function which copies the input-output relationship of the control module. In the above, the method further comprises copying the input-output relationship of the control module and outputting causative signals to the base layer. The learning layer can be constituted by, for example, neural networks.

In another embodiment, the user's direct selection is conducted by using an indication monitor which indicates the performance of the machine, wherein the user selects preferable performance indicated on the monitor. Further, in another embodiment, the user reaction is analyzed based on a change in operational action by the user in a pre-set time period.

The present invention can be applied not only to a method but also to a system. An appropriate system can be constructed accordingly. In addition, although the present invention can advantageously and preferably be applied to an engine, it can be applied to other machines as described above.

BRIEF DESCRIPTION OF THE DRAWINGS

These and other features of the invention will now be described with reference to the drawings of a preferred embodiment which is intended to illustrate and not to limit the invention, and in which:

FIG. 7 is a schematic diagram showing an embodiment wherein a first generation is created, which is composed of multiple individuals (#1 to #9) encoded by coupling coefficients, used as genes, of the neural network which learns the relationship among various factors.

FIGS. 19a, 19b, and 19c are schematic diagrams showing examples of smoothness values measured based on changes in throttle angle with time, wherein FIGS. 19a, 19b, and 19c illustrate the states of the throttle operated by the user when individuals #1, #2, and #3 are adopted, respectively.

DETAILED DESCRIPTION OF THE PREFERRED EMBODIMENTS OF THE INVENTION

Figure 1:
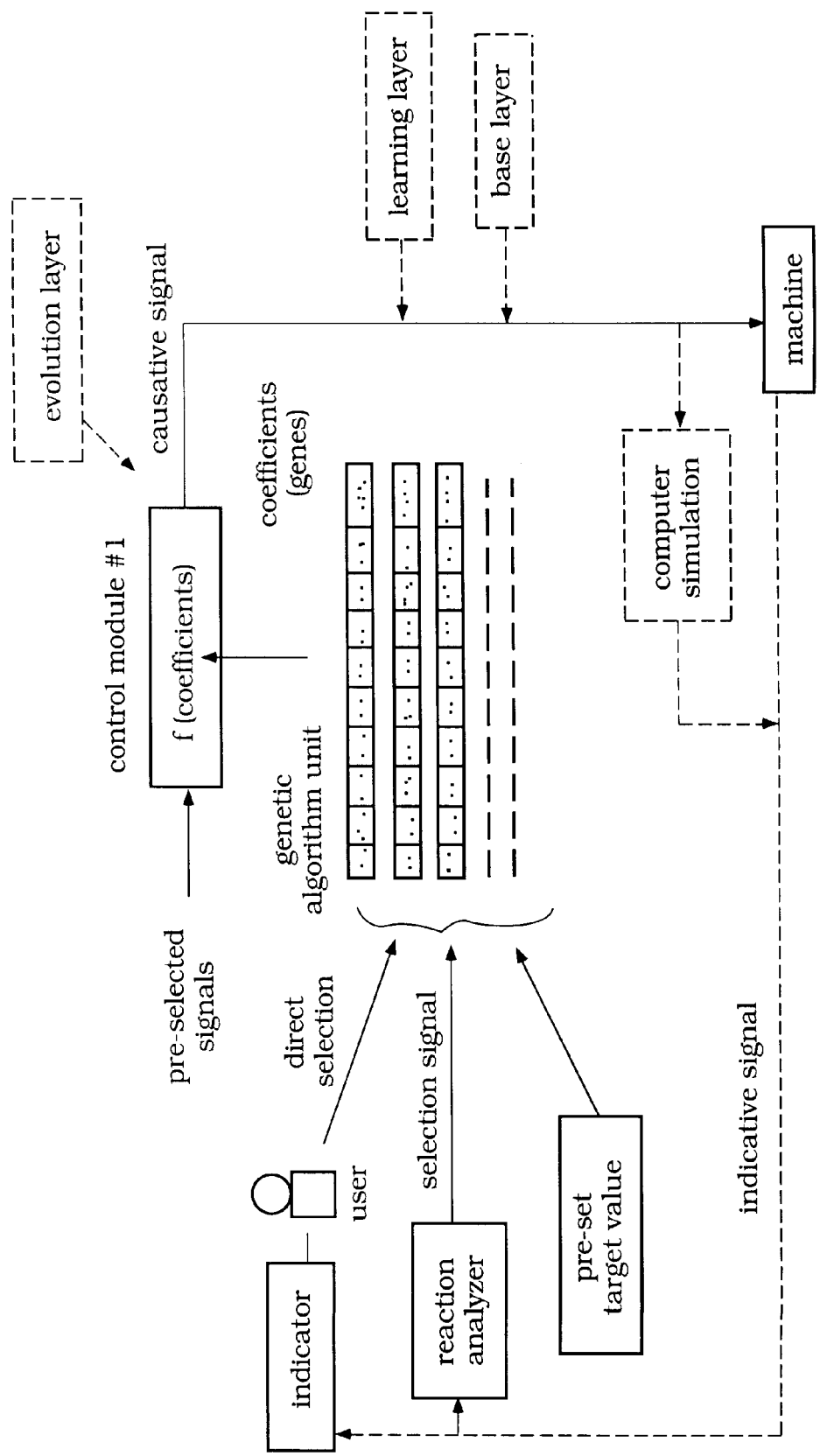
FIG. 1 is a schematic diagram showing embodiments of the present invention.

The present invention includes the following various aspects:

One aspect of the present invention is a method for evolutionally controlling a subject based on a user's preference by using a control system having control characteristics, comprising the steps of: selecting coefficients, as genes, affecting the control characteristics of the control system; creating plural control units as chromosomes, each being constituted by plural genes; expressing the genes of each chromosome as control characteristics by controlling the subject using the control system having the control characteristics; selecting at least one chromosome from the created chromosomes based on the control characteristics expressed by the genes in view of the user's preference; and causing said at least one chromosome to evolve by repeating the creating step, the expressing step, and the selecting step, while causing crossover and mutation of the genes, until the control system obtains control characteristics suitable to the user.

In the above, since plural chromosomes are created using coefficients affecting the control characteristics of the control system controlling the characteristics of a product to be controlled, and the chromosomes are subjected to selection based on the user's intention, thereby causing the chromosomes to undergo evolution using a genetic algorithm, the characteristics of the product can be changed after shipment in accordance with the user's intention, i.e., a customized or user-friendly product most suitable to each user can be supplied. Further, since the characteristics of a product to be controlled can be changed in accordance with the user's intention after its purchase, the user can give less weight to the initial characteristics of the product itself, and can select a product from a wide range at purchase. Further, the user can "train" a product to ease control of the subject particularly for the user and enjoy training and adapting the product to the user's preference. In addition, since a genetic algorithm is used as means for effecting evolution, evolution of the subject can efficiently be achieved.

In the above, when the user's intention is determined based on the user's command and/or is presumed based on operation characteristics of the user when controlling the object, it is not necessary to determine the user's direct preference regarding the characteristics of the object to be controlled, such as quick start, smooth acceleration at high speeds, stability, etc. The determination of the user's direct preference is relatively difficult and requires time-consuming processing. By the above simplified processing, the characteristics which are close to the user's direct preference can finally be obtained after repeating the simplified processing. If the user's intention is determined solely by the user's command, the determination of the user's intention can easily be achieved. If the user's intention is determined solely by the user's presumed intention, the user's direct role required for determining the user's intention can be minimized. If any combination of the above two determination methods is adapted, the benefit rendered by each method can be realized at the same time.

When the primary framework of selection is automatically conducted but the final selection is assigned to the user, the user's role of selection can be reduced while maintaining enjoyment of "training", i.e., adapting the subject to the user's preference. In the above, automatic selection can be conducted using an internal model formed by modeling behavior of the subject.

When a display indicating the characteristics of the subject is used, the user's role in the selection process can be reduced.

When smoothness of operation by the user which is likely to represent the user's intention is evaluated as an operation characteristic, and the smoothness of operation is computed based on the changes in degree of an operational action by the user and/or the frequency of the operational action by the user, the user's intention can easily be presumed by relatively simple processing.

When the range of changing in behavioral characteristics of the subject is limited, in the case of adopting the control system to an engine for a vehicle, for example, the engine can effectively be prevented from performing beyond the environmental standard for exhaust gas even if the engine characteristics are changed, i.e., it is possible to prevent an change in behavioral characteristics beyond the necessary.

In the foregoing, the user can retrieve any preferable characteristics stored in a memory at any time, thereby quickly changing the behavioral characteristics of the subject depending on the feeling of the user or the environment.

When the subject to be controlled is an engine for a vehicle, the characteristics of the engine can be changed to suit the user's preferences, thereby obtaining characteristics of the engine most suitable to each individual user.

When the subject to be controlled is a suspension system or seat, the characteristics of the damper of the suspension system or seat can be changed to suit the user's preferences, thereby obtaining characteristics of the damper most suitable to each individual user.

When the subject to be controlled is an auxiliary power unit installed in a bicycle or a wheelchair, the characteristics of the auxiliary power unit (motor) can be changed to suit the user's preferences, thereby effecting assistance most customized to each individual user.

When the subject to be controlled is a personal robot, the behavioral characteristics of the robot can be changed to suit the user's preferences, thereby obtaining behavioral characteristics of the robot most suitable to each individual user.

In addition, when the control system comprises neural networks learning relationships among the control characteristics using coupling coefficients, and the coefficients used as the genes are the coupling coefficients, the creating step can readily be performed.

In the foregoing, the method in short comprises changing characteristics of the control system of the subject in accordance with the user's preference. In practice, the control system outputs a basic output to control the subject, and the changing step comprises the steps of: creating multiple control modules (chromosomes) for representing at least one factor to be controlled; selecting at least one control module most adaptable for a current operational state based on the user's preference; learning information from said at least one control module; compensating for the basic output based on the result of the selection and the learning; and controlling the subject using the output compensated for. In the method, as described later, an evolution-fitness layer (hierarchy), a learning layer (hierarchy), and a reflection layer (hierarchy) are preferably used.

The evolutionary control system of the present invention will be explained further with reference to an embodiment shown in the figures described below.

Outline of Evolutionary Control System

Figure 2:
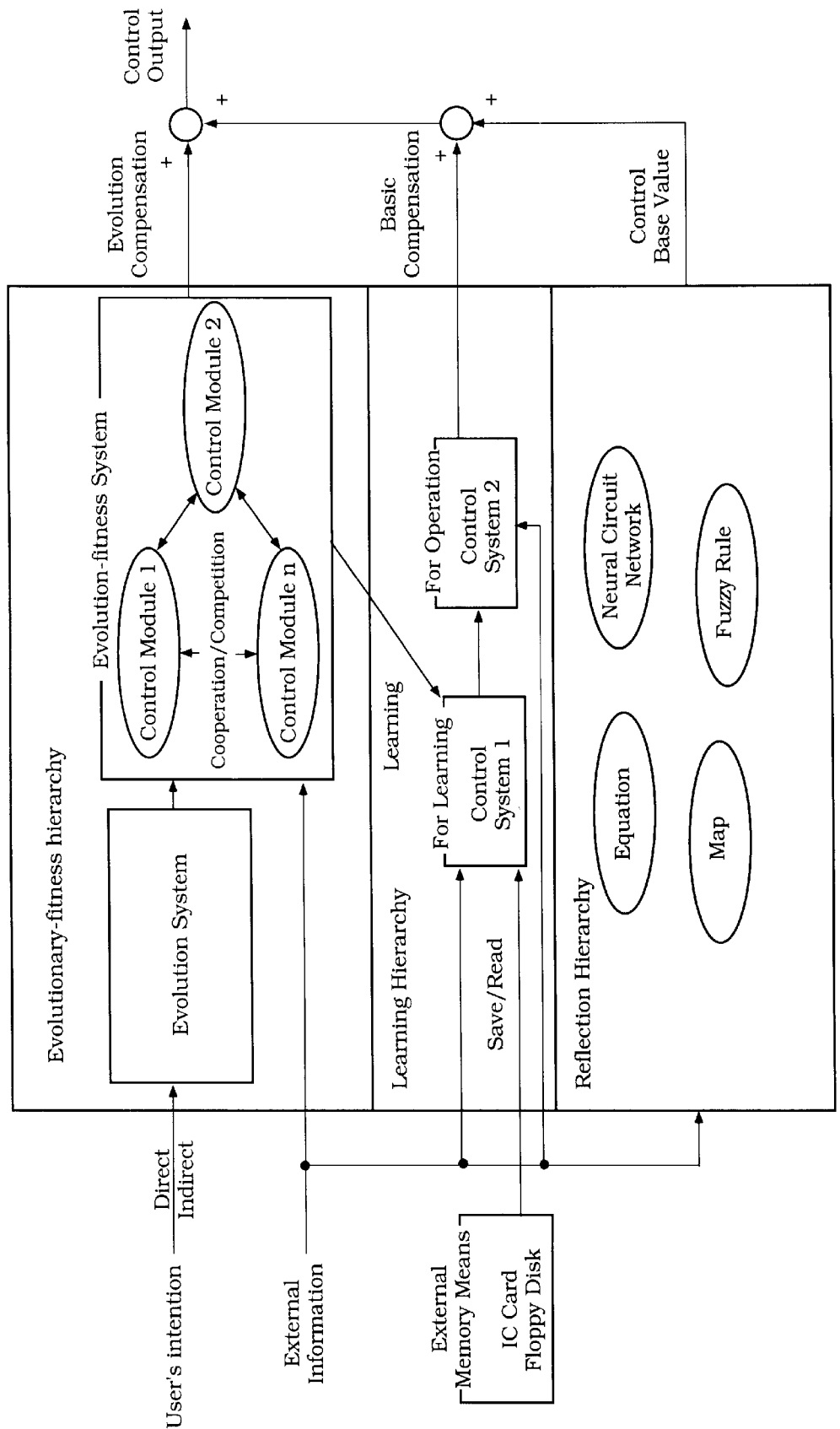
FIG. 2 is a block diagram showing one embodiment of the evolutionary control system according to the present invention.

FIG. 2 is a block diagram showing the basic principle of an evolutionary control system according to the present invention. As shown in FIG. 2, the evolutionary control system of this embodiment has three layers, i.e., a reflection layer, a learning layer, and an evolution-fitness layer, into which information related to the subject to be controlled, such as that related to a dynamic state, is input. Based on the information, a control base value is determined in the reflection layer, and compensations for the control base value are determined in the learning layer and in the evolution-fitness layer. A final control output is determined based on the control base value and the compensations.

The functions of the reflection layer, the learning layer, and the evolution-fitness layer in the evolutionary control system will be explained.

The reflection layer is a layer installing a relationship between information related to operational states of the subject to be controlled (hereinafter referred to as external information) and a control base value for the external information, in a control system such as in the form of equations, maps, fuzzy rules, a neural network, or subsumption architecture. When the external information is input thereinto, a control base value is determined for the external information input from the control system. The above subsumption architecture is known to be a behavioral artificial intelligence which conducts parallel processing.

The evolution-fitness layer is comprised of an evaluation system and an evolution-fitness system. The evaluation system is to input evaluation information (information related to characteristics of the subject) and information related to the user's intention, and based on the above information, the evolution-fitness system is changed in accordance with the user's intention. The evolution-fitness system is provided with at least one control module to compensate for the control base value to suit the user's intention. The at least one control module genetically evolves based on the determination in the evaluation system, and converts into a control module most suitable at the moment. Upon obtaining the most suitable control module, the control module is fixed in the evolutionary system which then outputs an evolutionary compensation which compensates for the control base value output from the reflection layer. In the above, each control module is one unit having a control system, which conducts integrated control.

The learning layer is comprised of two control systems mutually switchable, one for learning and the other for operation. While the control system for operation operates control, the control system for learning learns the relationship of input and output regarding the most suitably evolved control module in the evolution-fitness layer. After completing the learning in the control system for learning, the control system operating control and the control system that has finished learning are switched over, whereby the control system after learning starts operating control using a control module obtained from the learning, whereas the control system previously operating control starts functioning as a control system for learning. The information related to the after-learning control-module in the learning layer is readably saved in external memory means such as an IC card and a floppy disk. The user can pull out the information related to the most suitable control module in the past from the external memory means, according to the user's need, and the user can thereby output a basic compensation from the learning layer based on the information. Incidentally, the control system in the learning layer is set so as to output zero at the beginning, i.e., control is conducted by the reflection layer and the evolution-fitness layer at the beginning.

The evolution-fitness layer returns the output to zero after causing the learning layer to learn information related to the most suitable control module. Thereafter, the evolution-fitness layer operates in accordance with the user's intention.

According to the evolutionary control system described above, by the function of each layer, the control output changes with time in accordance with the user's intention, and as a result, the characteristics of the subject to be controlled change with time in accordance with the user's intention. In the present invention, the state, wherein the characteristics of the subject evolve to suit them to the characteristics of the user and/or the using conditions, is referred to as "training".

Control Flow of Evolutionary Control System

Figure 3:
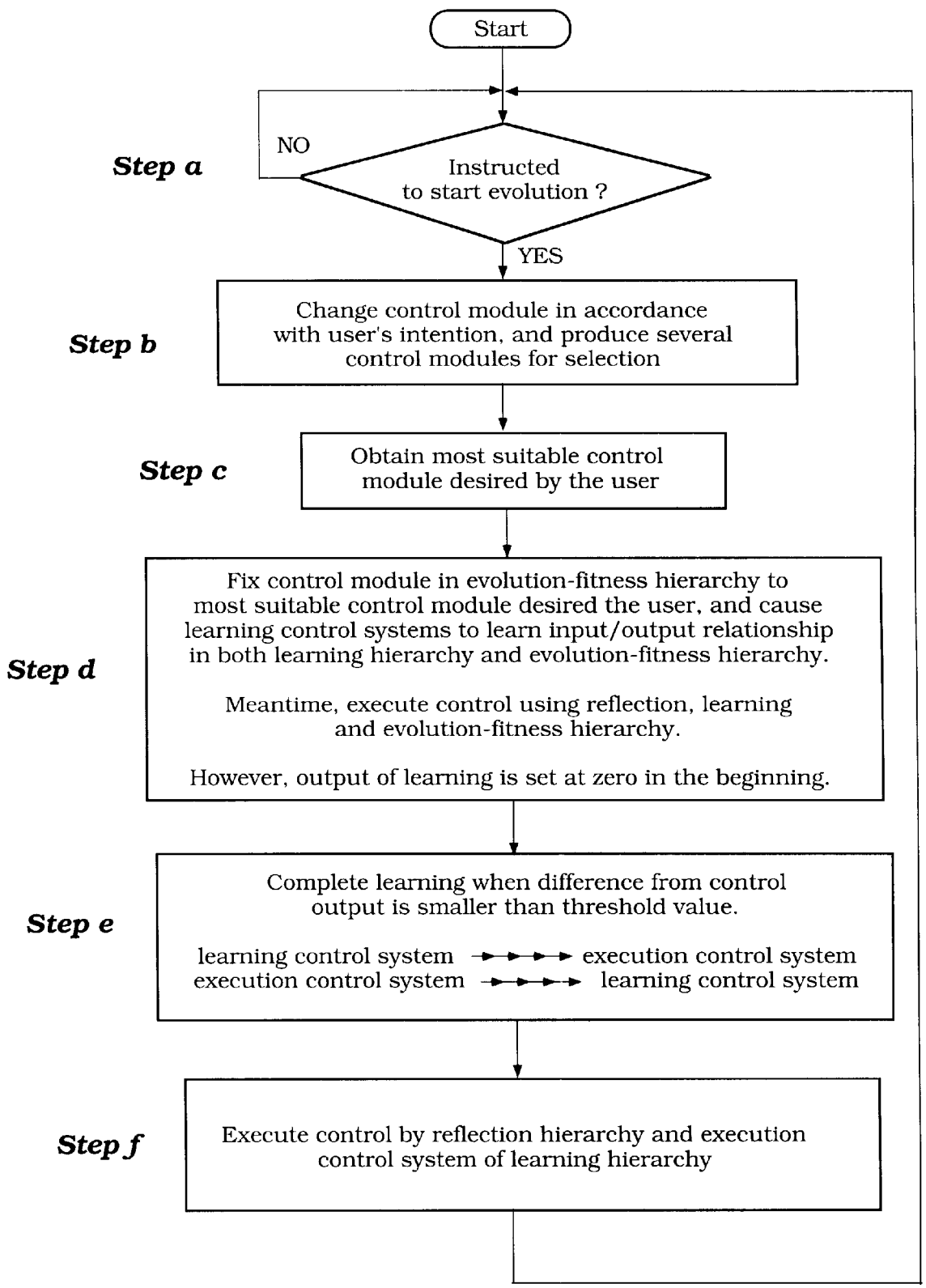
FIG. 3 is a flow chart of an evolutionary control system on a time basis, according to the present invention.

FIG. 3 is a flow chart of the evolutionary control system on a time basis.

In an initial state, it is determined whether or not a signal for initiating evolution is received from a user. When the signal to initiate evolution is received from the user, the following evolution-processing is activated (step a).

When receiving the signal of evolution-processing from the user, in the evolution-fitness layer, a certain number of control modules for evolution are generated from the control module present in the evolution-fitness layer. These control modules are subjected to selection based on the user's intention, and then, based on the remaining control modules, a certain number of control modules for evolution are further generated. The above generation of control modules for evolution and the above selection based on the user's intention are repeated at given times or until at least one control module most preferable which most conforms to the user's intention at the moment is obtained (step b), thereby obtaining at least one control module most preferable which most conforms to the user's intention at the moment (step c).

Upon obtaining the most preferable control module, the evolution-fitness layer fixes the control module(s) to the most preferable control module, and outputs a compensation (hereinafter referred to as an evolution-compensation) using the fixed control module(s), thereby compensating for the control base value outputted from the reflection layer. The learning layer learns, in the control system for learning, the relationship of input and output in the evolution-fitness layer wherein the control module(s) is fixed to the most preferable control module, in combination with the relationship of input and output in the control system for operation in the learning layer. During the above time period, control over the subject is conducted by the reflection layer, the control system for operation in the learning layer, and the evolution-fitness layer. In the above, the output from the learning layer is set at zero (step d).

When the difference between the value, which is obtained by adding the output from the control system for learning in the learning layer (hereinafter the output is referred to as "presumed compensation") to the control base value, and the value, which is the actual output (control base value+compensation outputted from the control system of the learning layer, hereinafter referred to as "basic compensation", +evolution compensation), is smaller than a predetermined threshold, the learning in the learning layer is completed. The control system for learning and the control system for operation are then switched over, i.e., the previous control system for learning functions as a control system for operation while the previous control system for operation functions as a control system for learning (step e). In this way, control is conducted by the reflection layer and the learning layer (step f).

After the evolution-fitness layer causes the learning layer to learn information related to the most preferable control module, the output from the evolution-fitness layer is fixed at zero, and thereafter, the evolution-fitness layer stands by until receiving a signal to initiate evolution from the user (step a).

Evolutionary Control System Adapted to Engine of Vehicle

In a first embodiment, the subject to be controlled is an engine installed in vehicles or vessels. However, in the evolutionary control system of the present invention, no restriction is imposed on the type of machine to be controlled, and as with the engine, a robot used in machine tools, a motor used in electrically-driven vehicles, or the like can be controlled by adopting the evolutionary control system based on the same principle as in the engine.

Figure 4:
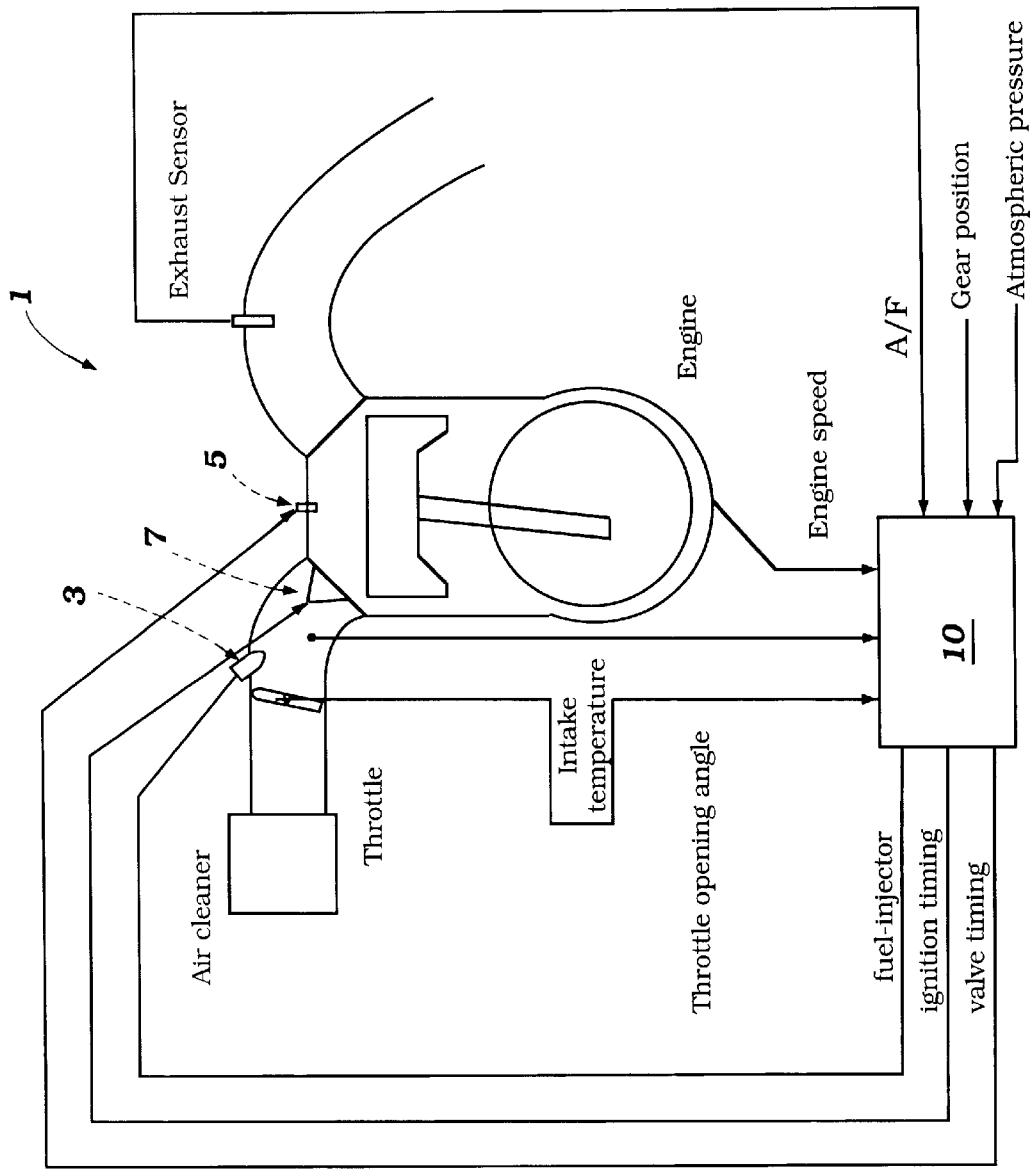
FIG. 4 is a schematic view showing the relationship between an engine and a control device performing the evolutionary control system of the present invention.

FIG. 4 is a schematic view showing the relationship between an engine 1 and a control device 10 performing the above-described evolutionary control system.

As shown in FIG. 4, the control device 10 controls the engine in such a way that fuel efficiency and acceleration performance are compatible with each other, by controlling the injection time period of an injector 3, the ignition timing of a ignition plug 5, and the valving timing of an intake valve 7, based on information input into the control device, such as the engine speed (r.p.m.), the degree of the throttle opening (angle), the atmospheric pressure, the intake temperature, the air-fuel ratio (A/F), and the driving speed.

Figure 5:
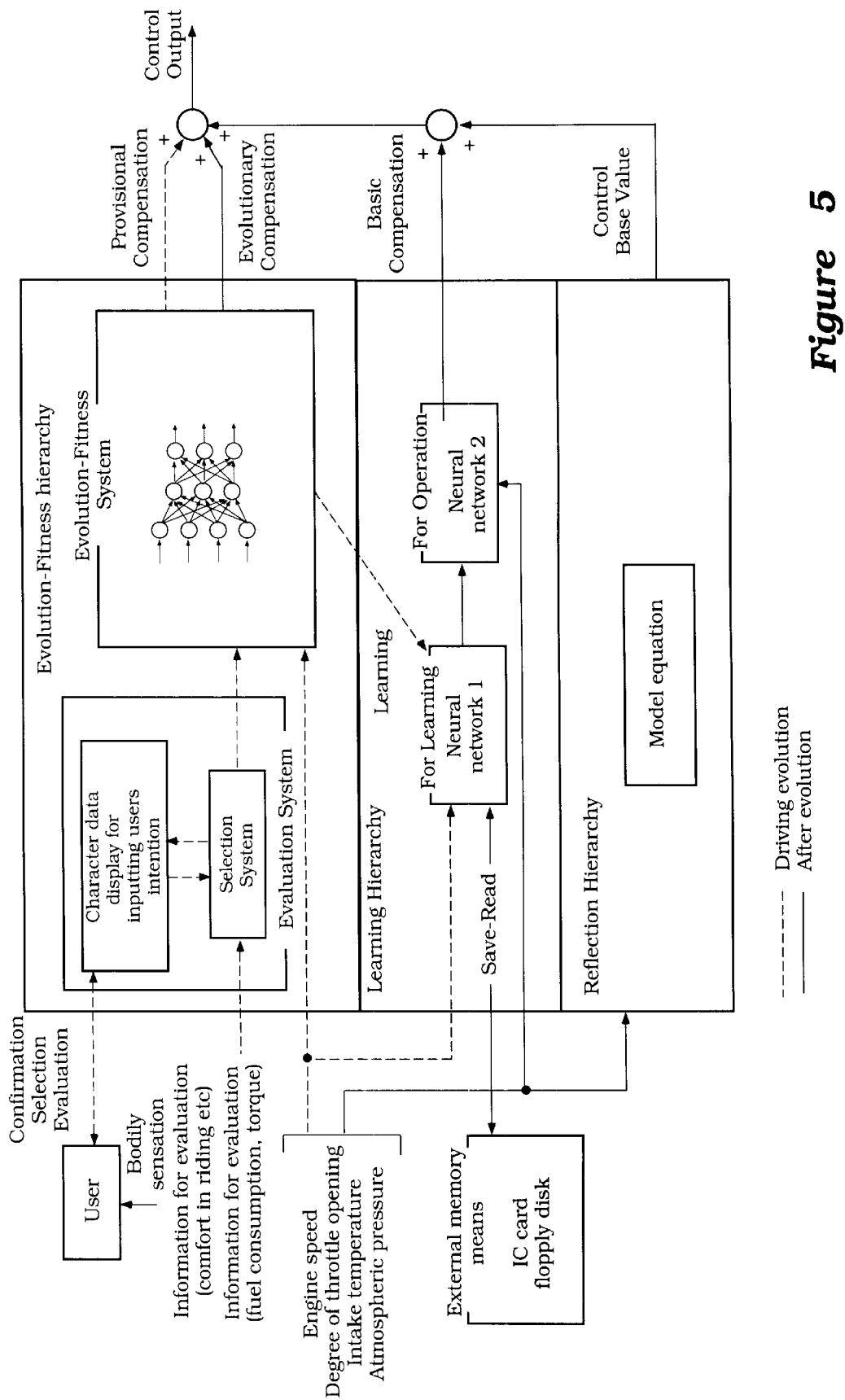
FIG. 5 is a schematic block diagram of a control unit used in an engine control system according to the present invention.

FIG. 5 is a schematic block diagram of the control device 10.

The control device 10 is comprised of the reflection layer, the learning layer, and the evolution-fitness layer as described above.

Reflection Layer Adapted to Engine Control

The reflection layer receives signals such as those of the engine speed, the degree of the throttle opening, the intake temperature, and atmospheric pressure, and the reflection layer determines and outputs a control base value that controls the injection time period of the injector 3, the ignition timing of the ignition plug 5, and the valving timing of the intake valve 7, using an equation formed by modeling numerical formulae obtained from the above input signals.

Evolution-fitness Layer Adapted to Engine Control

The evolution-fitness layer is comprised of an evaluation system and an evolution-fitness system.

Figure 6:
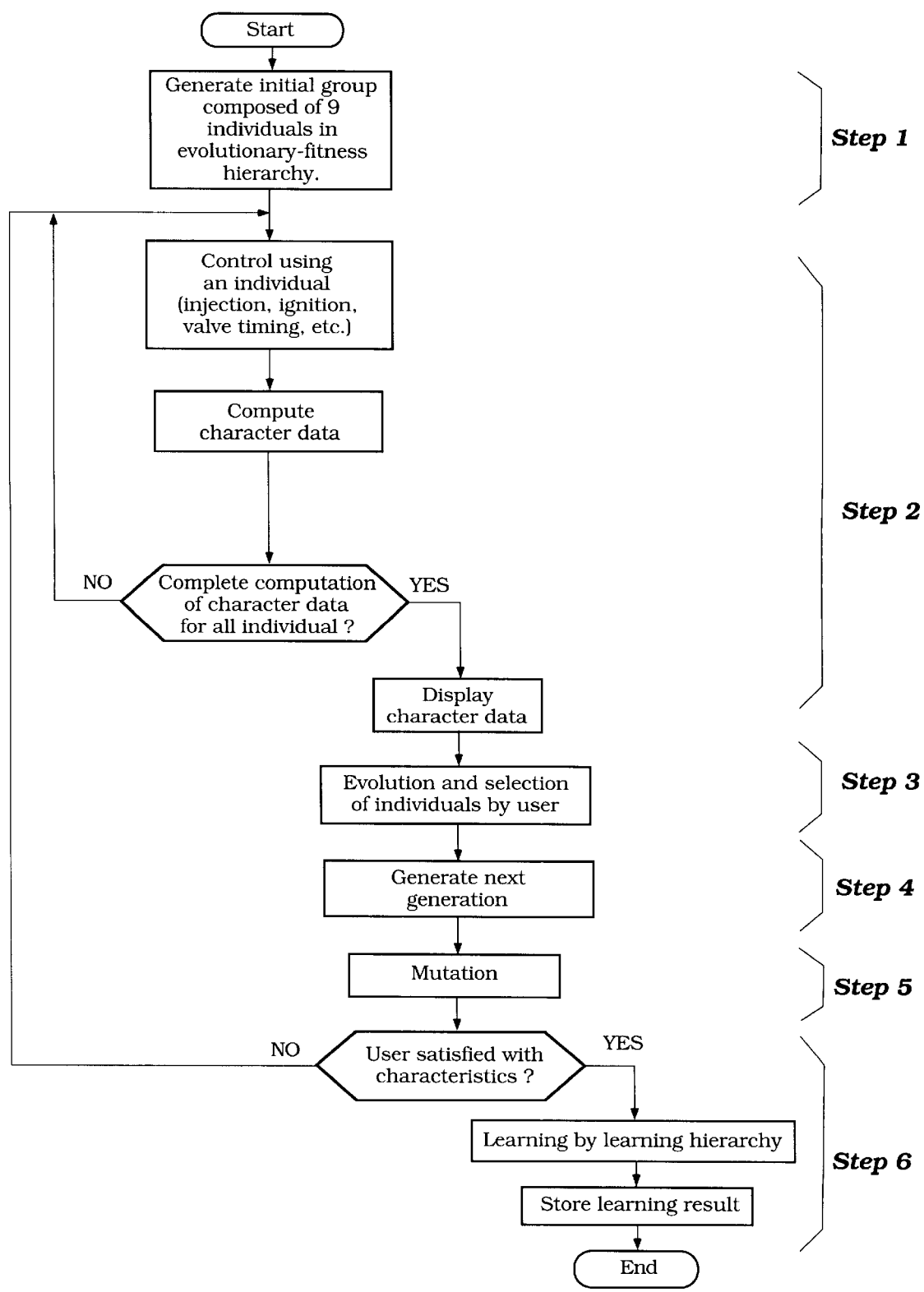
FIG. 6 is a flow chart showing a basic behavior of the evolution-fitness layer according to the present invention.

FIG. 6 is a flow chart showing a basic behavior of the evolution-fitness layer and the learning layer. The basic behavior of the evolution-fitness layer will be explained with reference to this chart.

Step 1: Formation of Initial Population (First Generation)

As shown in FIG. 7, the evolution-fitness layer comprises at least one control module comprised of a hierarchical neural network of a four-input/three-output type, which neural network receives as input the engine speed, the degree of the throttle opening, the intake temperature, and atmospheric pressure, and outputs a compensation for the fuel-injection quantity, the ignition timing, and the valving timing. When receiving a signal to initiate evolution from the user, a first generation is created, which is composed of multiple individuals (nine individuals #1 to #9 in this embodiment) encoded by coupling coefficients, used as genes randomly assigned, of the neural network. In the above, one individual denotes one chromosome contained in a genetic algorithm. Initial values of the genes, i.e., the coupling coefficients, of each individual are randomly set in a predetermined range (e.g., approximately −10 to 10). In the above, by creating one individual having a gene value (coupling coefficient value) of zero, it is possible to avoid abating, in the process of evolution, the performance characteristics lower than those before evolution.

Step 2: Computation of Character Data of Each Individual

The fuel-injection quantity, the ignition timing, and the timing of the intake valve are controlled based on the value which is the sum of the outputs from the reflection layer and the learning layer and the output from the evolution-fitness layer obtained using the coupling coefficients of the first individual (#1) of the first generation (hereinafter this output is referred to as "provisional compensation"). Provisional compensation Y, i.e., the output from the evolution-fitness layer, can be obtained by actually inputting the engine speed, the degree of the throttle opening, the intake temperature, and atmospheric pressure at the moment, into the neural network in which the coupling coefficients of individual #1 are used, to determine output x of the neural network, and then determining provisional compensation Y by linear transformation of the output x using equation (1). In the above, the input information such as the engine speed are used after being normalized.

$$Y = 2*Gx - G \quad (1)$$

wherein Y is a provisional compensation, x is an output from the neural network, and G is an output gain of the evolution-fitness layer. By linear transformation of the output x of the neural network, the compensation outputted from the evolution-fitness layer does not become extremely high, i.e., evolution progresses gradually as a whole. That is, an extreme change in engine behavior due to the evaluation or evolution is prevented.

Figure 8A:
FIG. 8 illustrates one example of a manner visually expressing the characteristics of each individual (chromosome). (a) shows that torque is high at low and intermediate speeds, but torque and fuel efficiency are low at a high speed. (b) shows that fuel efficiency is very good, but torque is low at any speed. (c) shows that both torque and fuel efficiency are reasonably good.
Figure 8B:
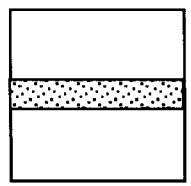
Figure 8C:
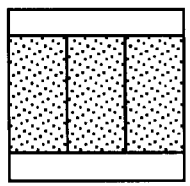

Evaluation information such as the air-fuel ratio and the engine speed is then inputted into the evaluation system after traveling for a while with the provisional compensation Y (derived from individual #1) being kept outputted from the evolution-fitness layer. In the evaluation system, based on this evaluation information, torque and fuel efficiency of the engine controlled using individual #1 are determined, and the character data regarding the torque and fuel efficiency of the individual are indicated on a display located near e.g., the meter units, in a manner shown in FIG. 8. (*a*) to (*c*) in this figure illustrate one example of a manner expressing the evaluation result of the individual. In each figure, the width of the square indicates the magnitude of torque, the color (light and shade) indicates the fuel efficiency, and the height divided into three portions shows the speed. The torque increases proportionally to the width, the fuel efficiency improves proportionally to the depth of the color (light and shade), and the upper, middle, and lower portions of the speed indicate high, intermediate, and low, respectively.

Figure 9:
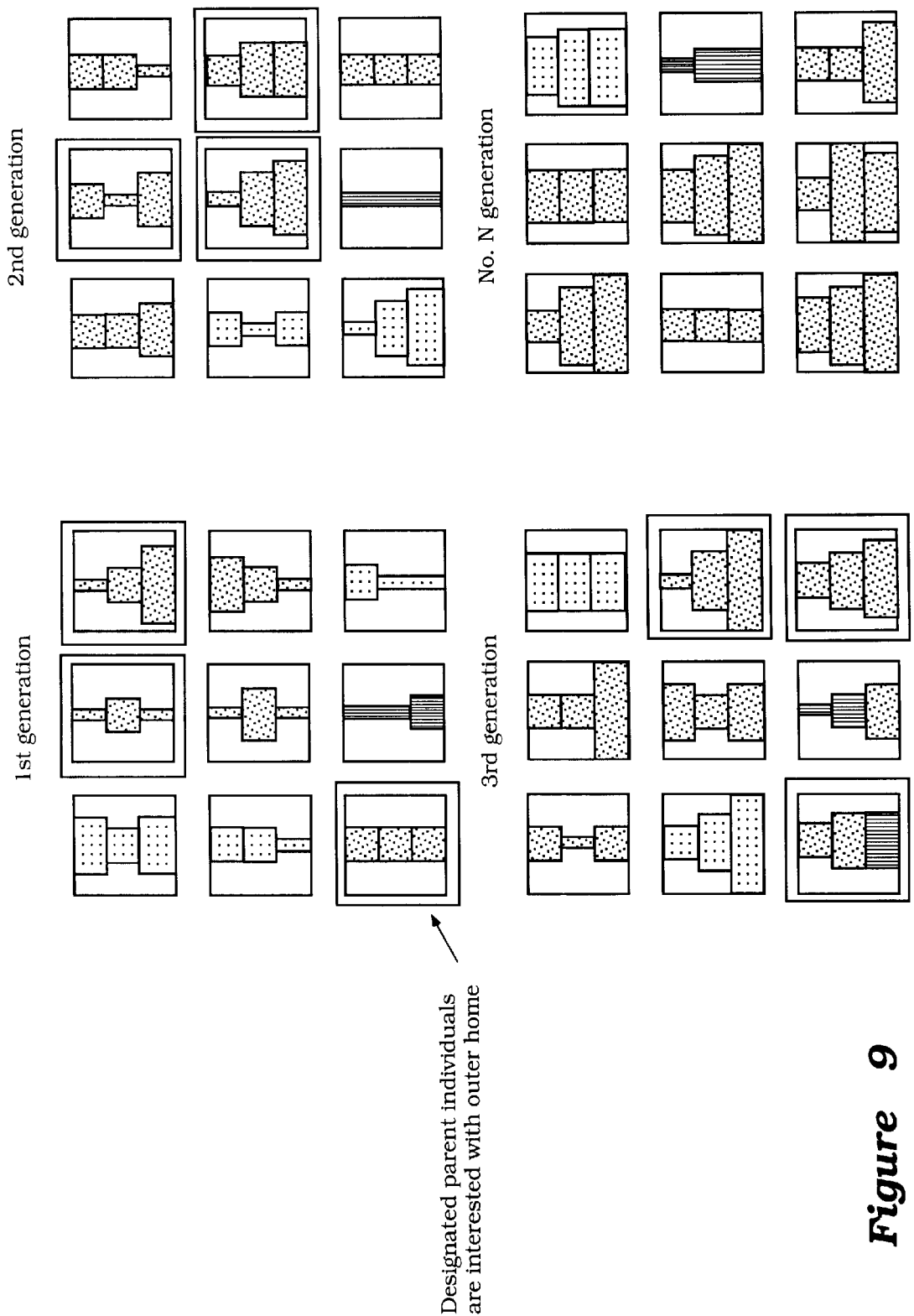
FIG. 9 illustrates one example of a manner visually expressing the characteristics of a population consisting of nine individuals (chromosomes).

The above computation of character data of each individual is conducted on the population, i.e., all of the individuals of the first generation, and each individual's character data is indicated simultaneously on one display, as shown in FIG. 9.

Step 3: Evaluation and Selection by User

After completion of display of the all nine individuals' character data (individuals #1 to #9), control is switched once to an evaluation mode. In this mode, when the user selects an individual which the user wants to use for a trial run, based upon the character data indicated on the display, the evolution-fitness layer conducts control by temporarily fixing the neural network at the coupling coefficient of the individual selected by the user, i.e., based on the selected individual. Accordingly, the user evaluates the characteristics of each of the nine individuals indicated on the display, based on whether or not it is comfortable to ride in during actual driving, i.e., the user evaluates the fitness of each individual based on the feeling of comfort.

After completion of evaluation of each individual based on the character data visually indicated on the display, as well as the degree of comfort in riding, the control mode is changed to a selection mode, thereby conducting selection of individuals of the first generation. This selection can be conducted by, for example, touching the display with a finger to select several individuals having the desired characteristics from the individuals of the first generation, as shown in FIG. 9 (see the first generation in FIG. 9). The selected individuals are designated as parent individuals and allowed to survive, and the remaining individuals are deleted (the designated parent individuals are indicated with an outer frame in FIG. 9).

Step 4: Crossover

Figure 10:
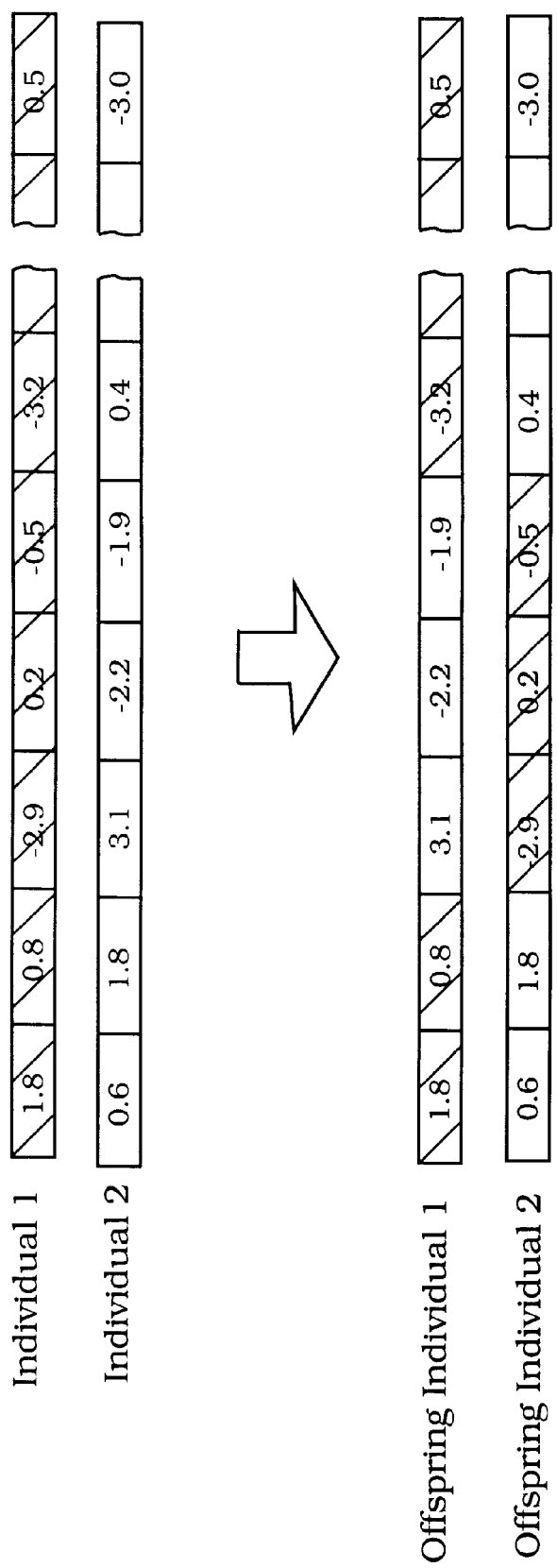
FIG. 10 illustrates the concept of crossover between individuals (chromosomes).

After completion of selection of parent individuals by the user, two parent individuals are selected therefrom, using random numbers. Accordingly, two offspring individuals (children) are generated from the two parent individuals by performing crossover processing (see FIG. 10). By repeating this step five times, nine individuals are generated (the tenth individual is discarded), i.e., a second generation is generated.

In the above, the crossover between individuals may be single-point crossover, double-point crossover, or normal distribution crossover.

The normal distribution crossover is a method of creating offspring based on a rotation-symmetrical normal distribution with respect to an axis connecting the parents, using chromosomes expressed by the actual number (individuals). The standard deviation of the normal distribution are correlated with the distance between the parents in terms of the components in the direction of the main axis connecting the parents. Other components of the axis are made correlated with the distance between the line connecting the parents and a third parent sampled from the group. This crossover method has an advantage that the characteristics of the parents are easily passed on to their offspring.

Step 5: Mutation

Figure 11:
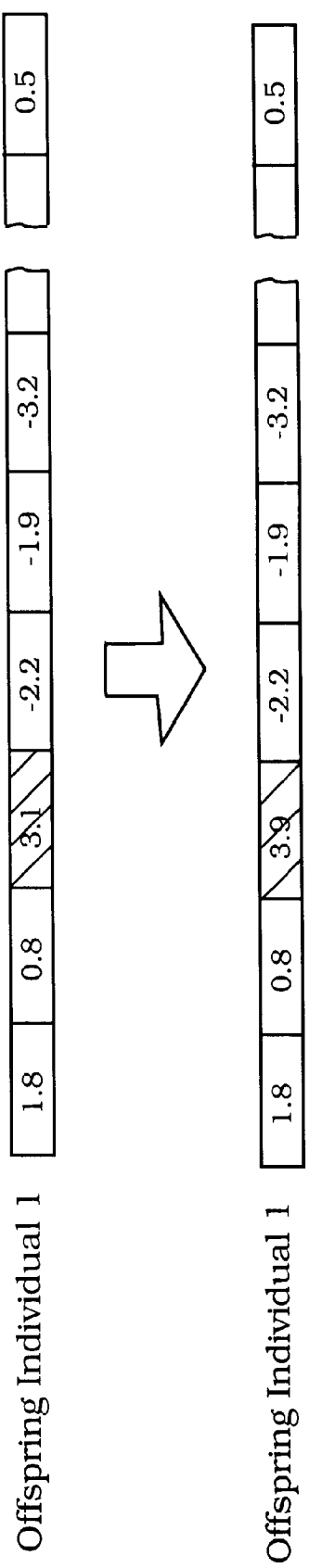
FIG. 11 illustrates the concept of mutation of an individual (chromosome).

After the creation of the nine offspring individuals, mutation of genes is caused in the created nine offspring by randomly changing the gene value (the degree of coupling) at a given probability (see FIG. 11).

Step 6: Learning and Preservation (Learning Layer)

Steps 2 to 6 are repeated until an individual, which has the characteristics satisfying the user, is selected. When the individual satisfying the user is obtained, the user terminates the evolution process by designating the individual as the most preferable individual. After selection of the most preferable individual, the evolution-fitness layer fixes the coupling coefficients of the neural network at those of the most preferable individual. After the neural network is fixed at the most preferable individual, the evolution-fitness layer conducts control based on the evolution compensation for, for example, the actual engine speed outputted from the neural network.

Upon activating control based on the evolution compensation by the evolution-fitness layer, the neural network for learning of the learning layer undergoes learning the relationship between the input and output of the evolution-fitness layer, in combination with the relationship between the input and output of the neural network functioning as a neural network for operation. Meanwhile, the output of the evolution-fitness layer is derived from the individual which maximizes the previous evaluation equation, and thus, the control pattern does not change with time.

Figure 12:
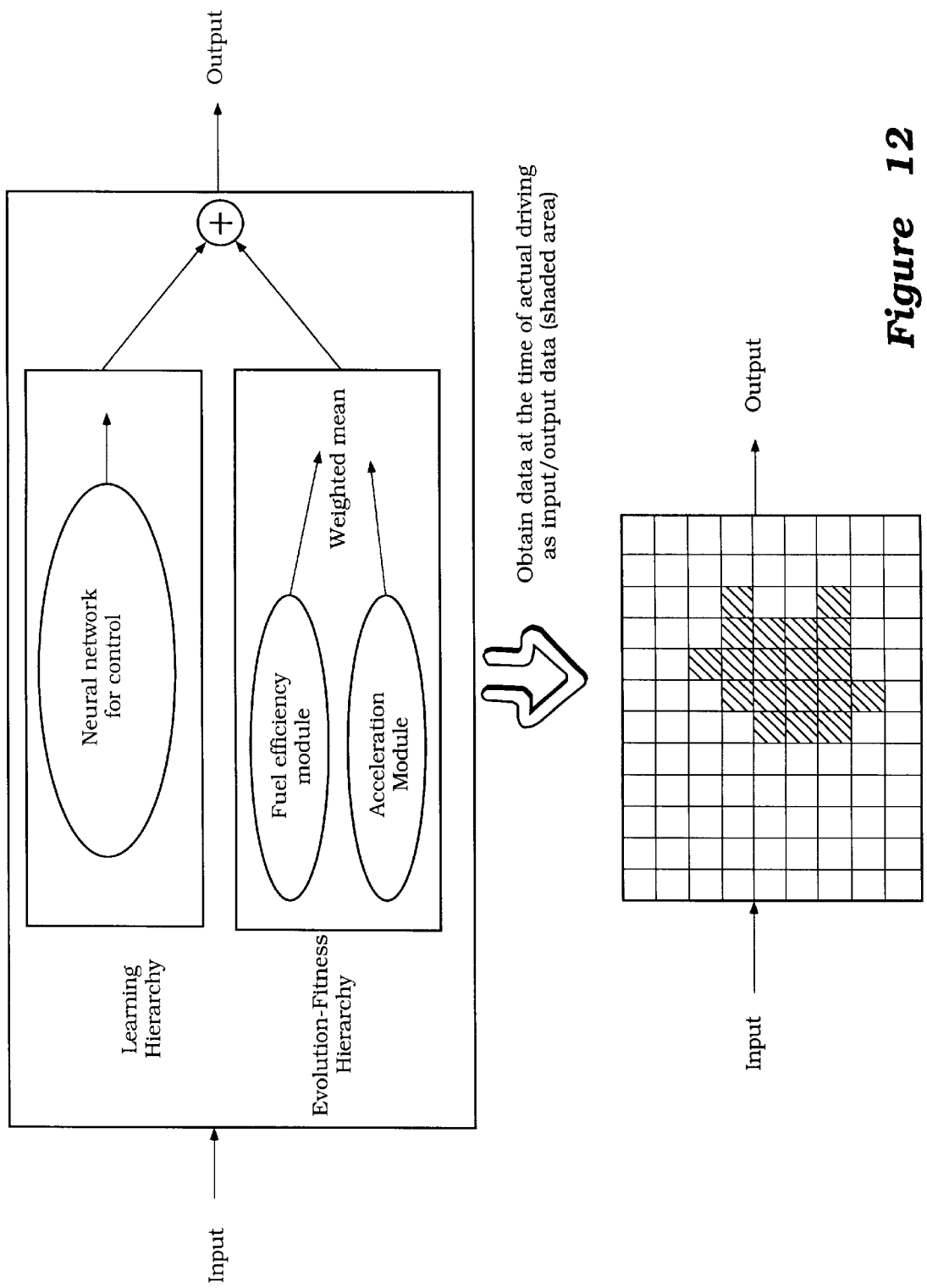
FIG. 12 is a diagram showing how to obtain input and output data to control the engine, which are the sum of actual data of operation, an evolutionary compensation, and a basic compensation.
Figure 13:
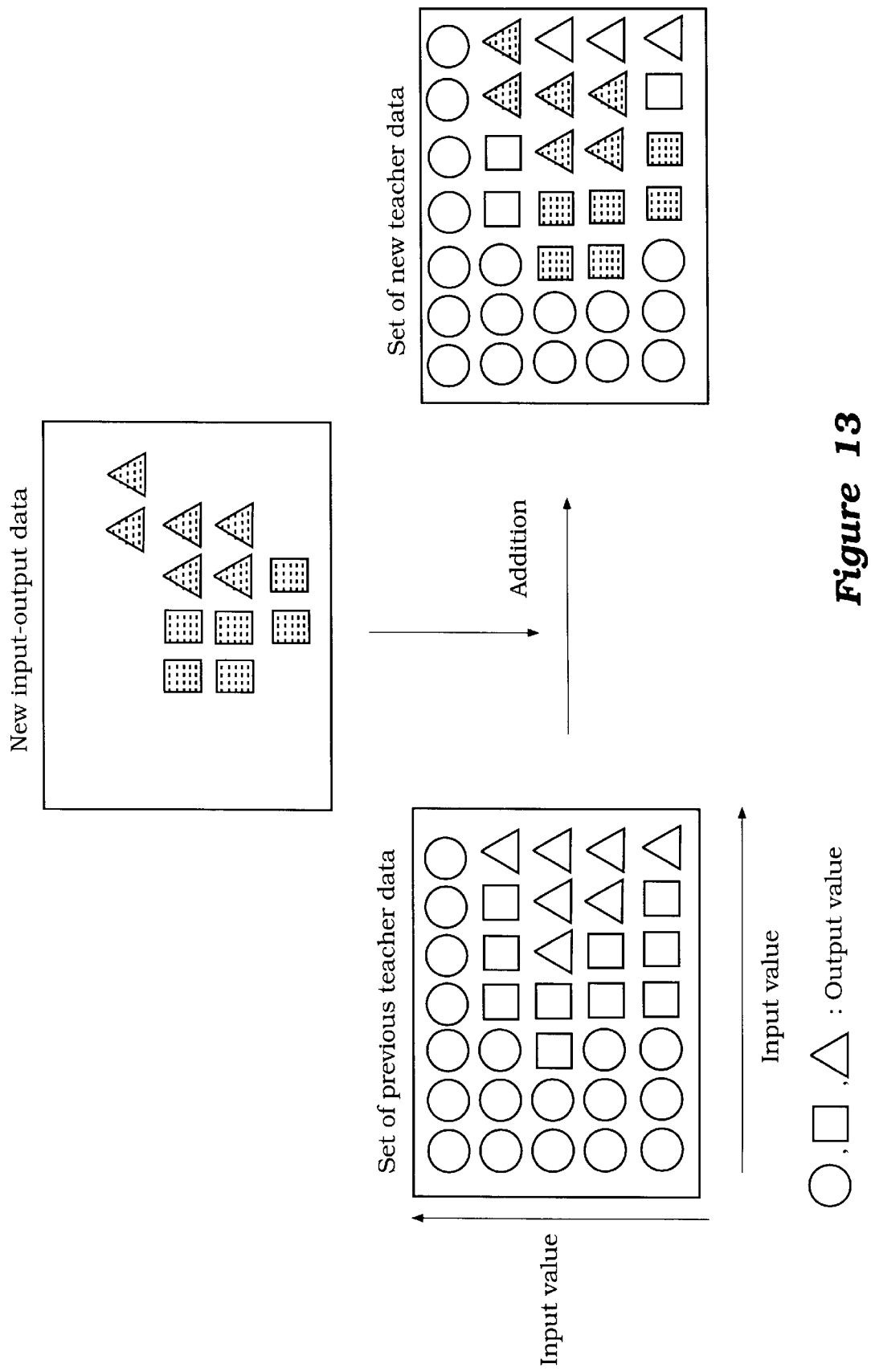
FIG. 13 is a diagram showing how to renew a set of teacher data, wherein old teacher data, whose Euclidean distance from the new data in a set of teacher data is less than a given value, are replaced with the new data.

The aforesaid learning, the input and output of the evolution-adaptation layer, and the input and output of the neural network for learning of the learning layer are averaged at a given step width to use data of the input and output to renew a set of educator data (teacher data). For example, if the average engine speed per second is 5,000 r.p.m.'s, the average degree of the throttle opening is 20, the average intake temperature is 28 C, and the average atmospheric pressure is 1013 hPa, the sum of these values and the output from the evolution-fitness layer and the neural network for operation of the learning layer (i.e., the evolution compensation and the basic compensation), is used as input and output data (see FIG. 12). The thus-obtained input and output data are added to the previous teacher data to obtain new teacher data. In the above, old teacher data, whose Euclidean distance from the new data in a set of teacher data is less than a given value, are deleted. This process is shown in FIG. 13. The initial values of a set of teacher data are set so as to output zero for all input data.

The learning layer learns a coupling coefficient of the neural network for learning based on the renewed set of teacher data. The learning continues until a deviation between (a) a presumed control output, which is obtained from an output from the neural network for learning (i.e., presumed compensation) and a control base value from the reflection layer, and (b) the actual control output, is less than a threshold. After completing the learning, the neural network for learning is switched to that for operation, while the neural network previously for operation is switched to that for learning. After this process, the learning layer determines the basic compensation using the newly-obtained neural network for operation, and actually outputs the result. When the learning layer functions as above, the output from the evolution-adaptation layer is zero, i.e., control is conducted by the learning layer and the reflection layer.

The initial value of the neural network for operation in the learning layer is set so as to output zero. Accordingly, in an initial state, control can be conducted only by the reflection layer and the evolution-fitness layer.

The coupling coefficient of the neural network for operation which has completed learning can readably be saved in external memory means such as a floppy disk and an IC card. In this way, the characteristics of the most preferable individual once obtained by the evolution process can be resumed or retrieved. Accordingly, the user's preferred characteristics can immediately be realized in accordance with the driving area, the road conditions, or the feeling of the user at the moment.

In addition, the above-described evolution process of the control modules by using a genetic algorithm can be conducted as many times as the user wishes, simply by inputting a signal to initiate evolution.

Figure 14:
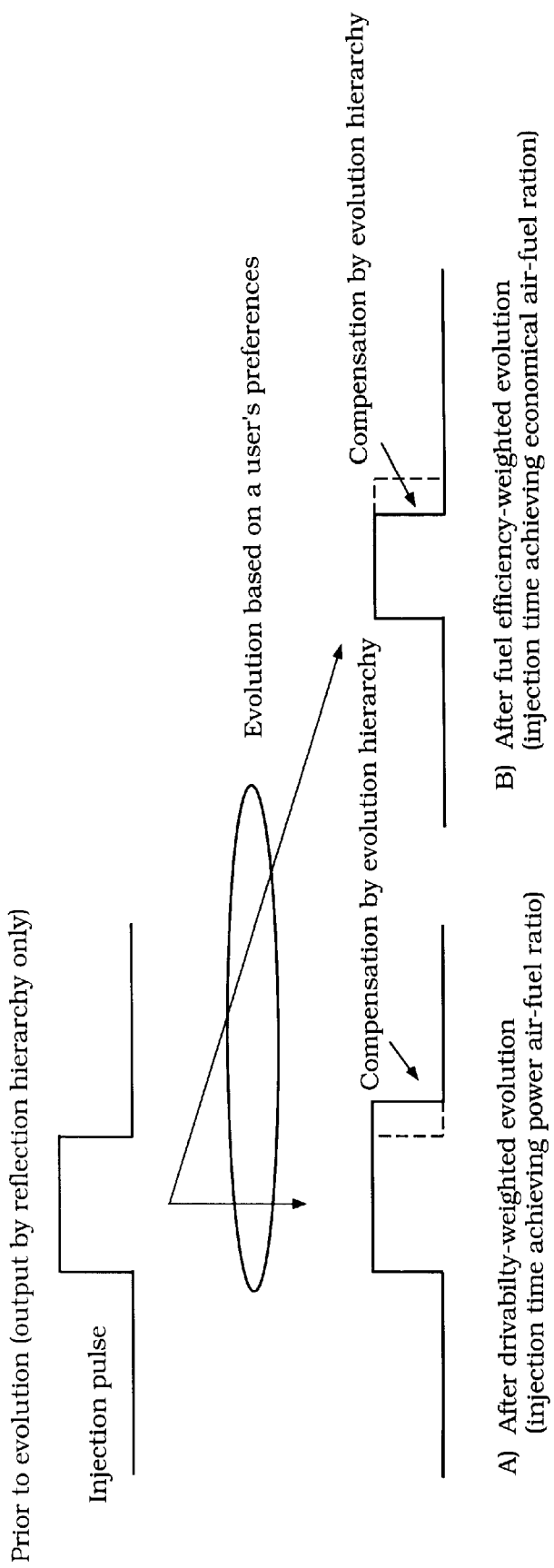
FIG. 14 illustrates a change in the control over injection impulses for an injector, for example, before and after the evolution process according to the present invention.

FIG. 14 illustrates the change in the control over injection impulses for an injector, for example, before and after the above evolution process. As shown in this figure, by the above evolution process, the engine is "trained" to suit the user's preference, e.g., a fuel efficiency-weighted type or a low-speed torque-weighted type.

Another Evolutionary Control System Adapted to Engine of Vehicle

A second embodiment of the evolutionary control system of the present invention will be explained with reference to FIGS. 15–20.

The difference between the previous first embodiment and the second embodiment resides in the manner of selection of control modules for evolution in the evolution-fitness layer for the evaluation system. In the first embodiment, selection is conducted based on the user's direct command or indication whereas, in the second embodiment, selection is conducted autonomously, based on a presumption of the user's intention. As with the first embodiment, the second embodiment will be explained in connection to an engine installed in vehicles or vessels. However, in the evolutionary control system of the present invention, no restriction is imposed on the type of machine to be controlled, and as with the engine, a robot used in machine tools, a motor used in electrically-driven vehicles, or the like can be controlled by adopting the evolutionary control system based on the same principle as in the engine.

Figure 15:
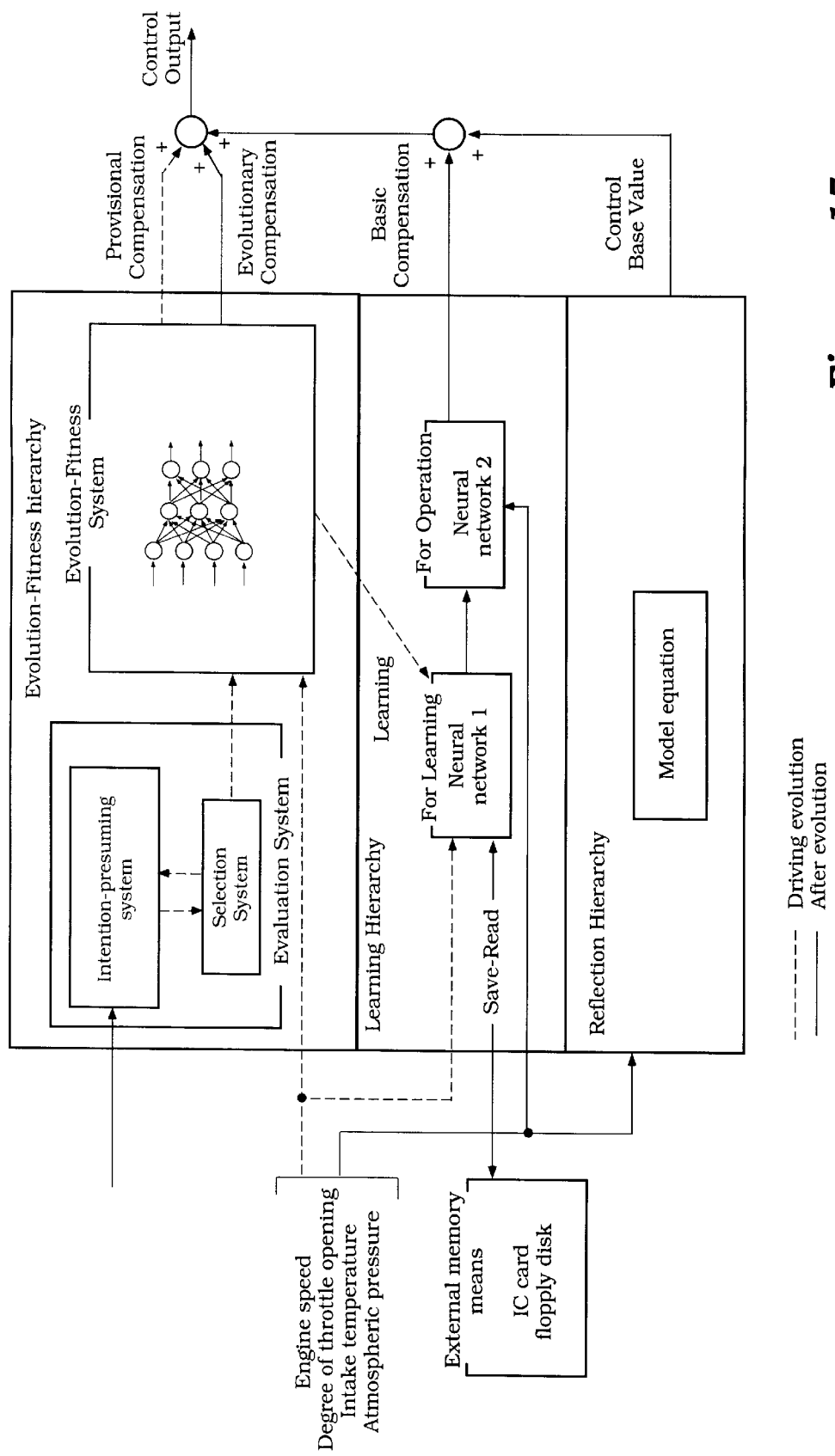
FIG. 15 is a schematic block diagram of the control device.

FIG. 15 is a schematic block diagram of the control device.

As with the first embodiment, the control device is comprised of the reflection layer, the learning layer, and the evolution-fitness layer as described above.

Reflection Layer Adapted to Engine Control

The reflection layer receives signals such as those of the engine speed, the degree of the throttle opening, the intake temperature, and atmospheric pressure, and the reflection layer determines and outputs a control base value that controls the injection time period of the injector, the ignition timing of the ignition plug, and the valving timing of the intake valve, using an equation formed by modeling numerical formulae obtained from the above input signals.

Evolution-fitness Layer and Learning Layer

The evolution-fitness layer is comprised of an evaluation system and an evolution-fitness system. The evaluation system includes an intention-presuming system and a selection system. In the intention-presuming system, the user's intention is presumed upon receiving information about operation characteristic. In the selection system, evaluation and selection of individuals generated at the evolution-fitness system are based on the presumed user's intention.

Figure 16:
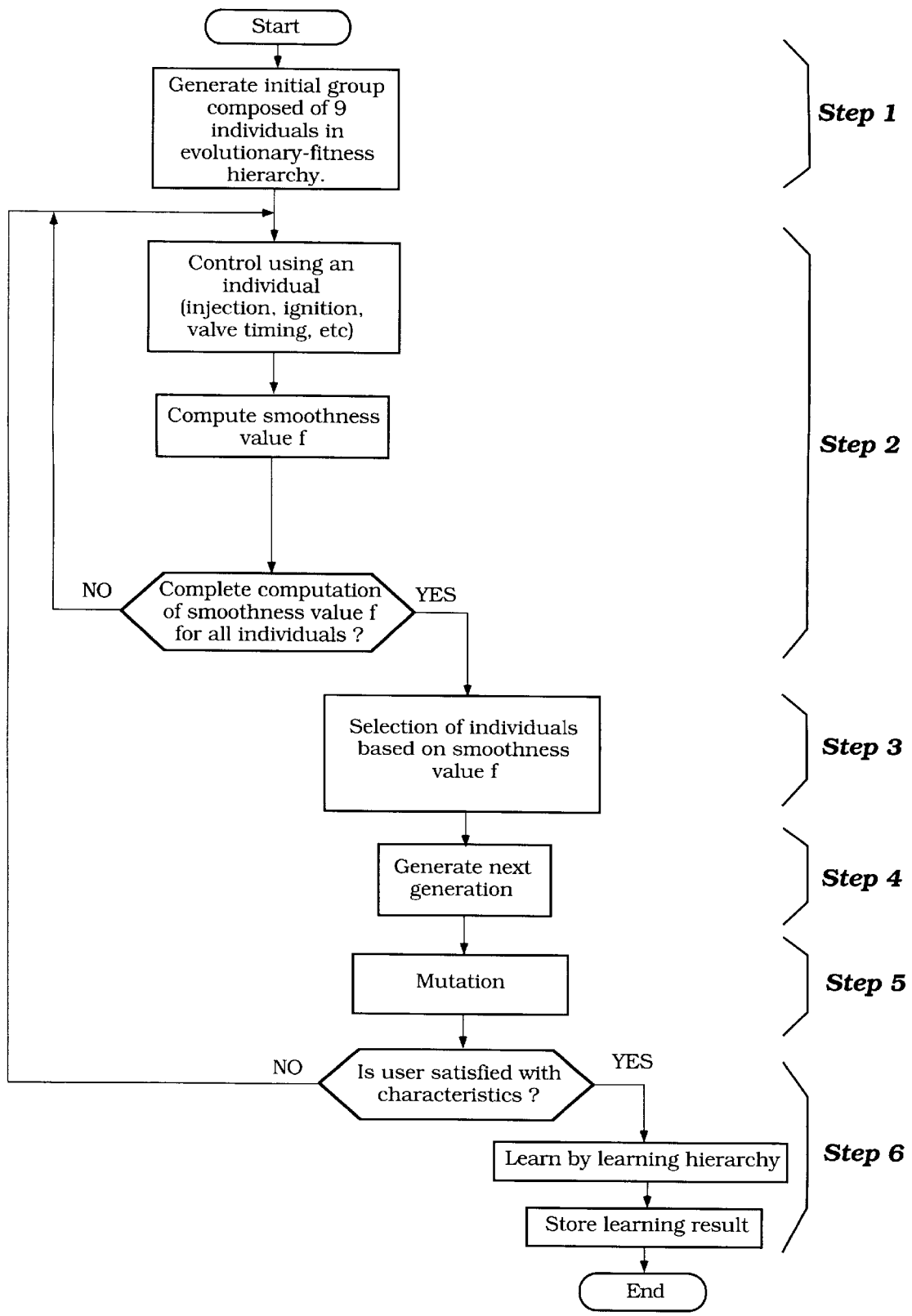
FIG. 16 is a flow chart showing a basic behavior of the evolution-fitness layer and the learning layer. The basic behavior of the evolution-fitness layer will be explained with reference to this chart.

FIG. 16 is a flow chart showing a basic behavior of the evolution-fitness layer and the learning layer. The basic behavior of the evolution-fitness layer will be explained with reference to this chart.

Step 1: Formation of Initial Population (First Generation)

As in the first embodiment, the evolution-fitness layer comprises at least one control module comprised of a hierarchical neural network of a four-input/three-output type, which neural network receives as input the engine speed, the degree of the throttle opening, the intake temperature, and atmospheric pressure, and outputs a compensation for the fuel-injection quantity, the ignition timing, and the valving timing. When receiving a signal to initiate evolution from the user, a first generation is created, which is composed of multiple individuals (nine individuals #1 to #9 in this embodiment) encoded by coupling coefficients, used as genes randomly assigned, of the neural network. In the above, one individual denotes one chromosome contained in a genetic algorithm. Initial values of the genes, i.e., the coupling coefficients, of each individual are randomly set in a predetermined range (e.g., approximately –10 to 10). In the above, by creating one individual having a gene value (coupling coefficient value) of zero, it is possible to avoid abating, in the process of evolution, the performance characteristics lower than those before evolution.

Step 2: Computation of Character Data of Each Individual

The fuel-injection quantity, the ignition timing, and the timing of the intake valve are controlled based on the value which is the sum of the outputs from the reflection layer and the learning layer and the output from the evolution-fitness layer obtained using the coupling coefficients of the first individual (#1) of the first generation (hereinafter this output is referred to as "provisional compensation"). As in the first embodiment, provisional compensation Y, i.e., the output from the evolution-fitness layer, can be obtained by actually inputting the engine speed, the degree of the throttle opening, the intake temperature, and atmospheric pressure at the moment, into the neural network, and then determining provisional compensation Y by linear transformation of the output value.

Traveling actually takes place for a time period ΔT with the provisional compensation Y (derived from individual #1) being continuously outputted from the evolution-fitness layer. The evaluation system in the evolution-fitness layer receives information about an operation manner of the user during this period, and computes an operation characteristic of the user based on the information about the user's operation manner.

In this embodiment, the aforesaid operation characteristic is "smoothness" of the user's operation. The degree of smoothness is computed as "smoothness value f". In processing in step 2, "smoothness value f" is computed for all of the individuals in order to subject the generated nine individuals to a selection process based on "smoothness value f" as described later.

Figure 17:
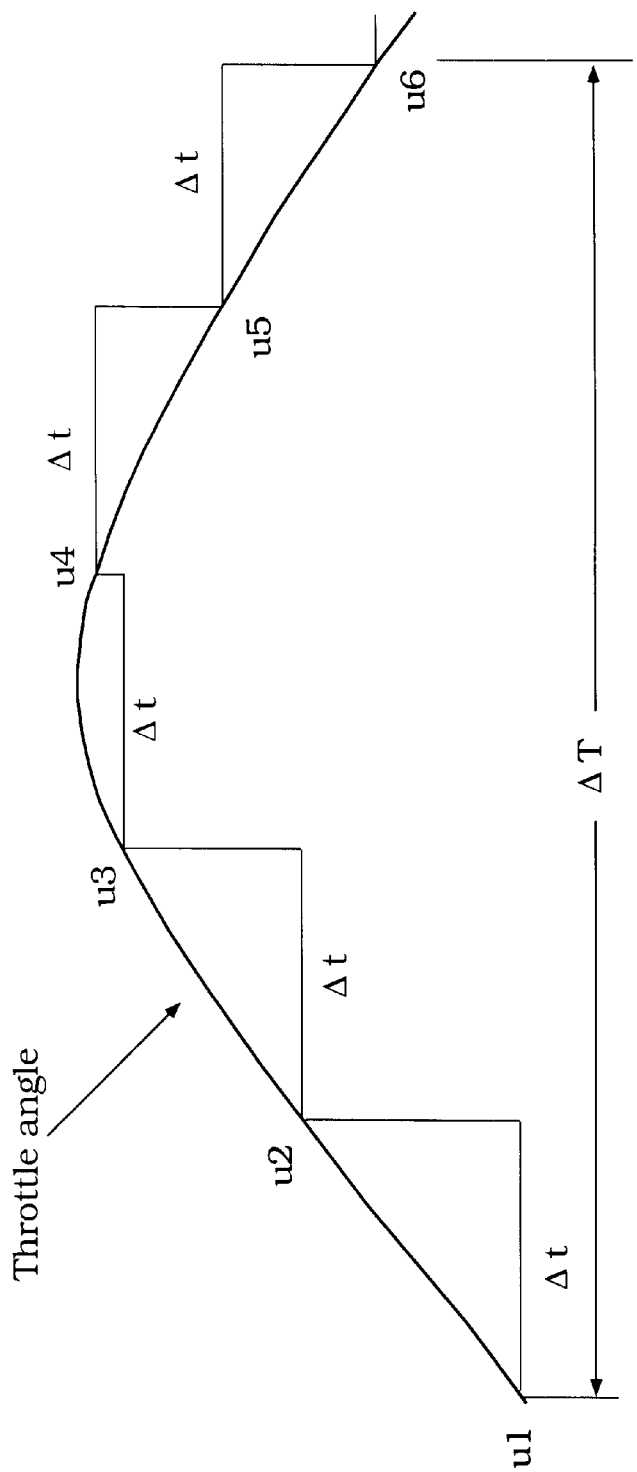
FIG. 17 is a conceptional diagram showing the relationship between the change in throttle angle and the smoothness value f for computing smoothness value f as operation characteristic.
Figure 18:
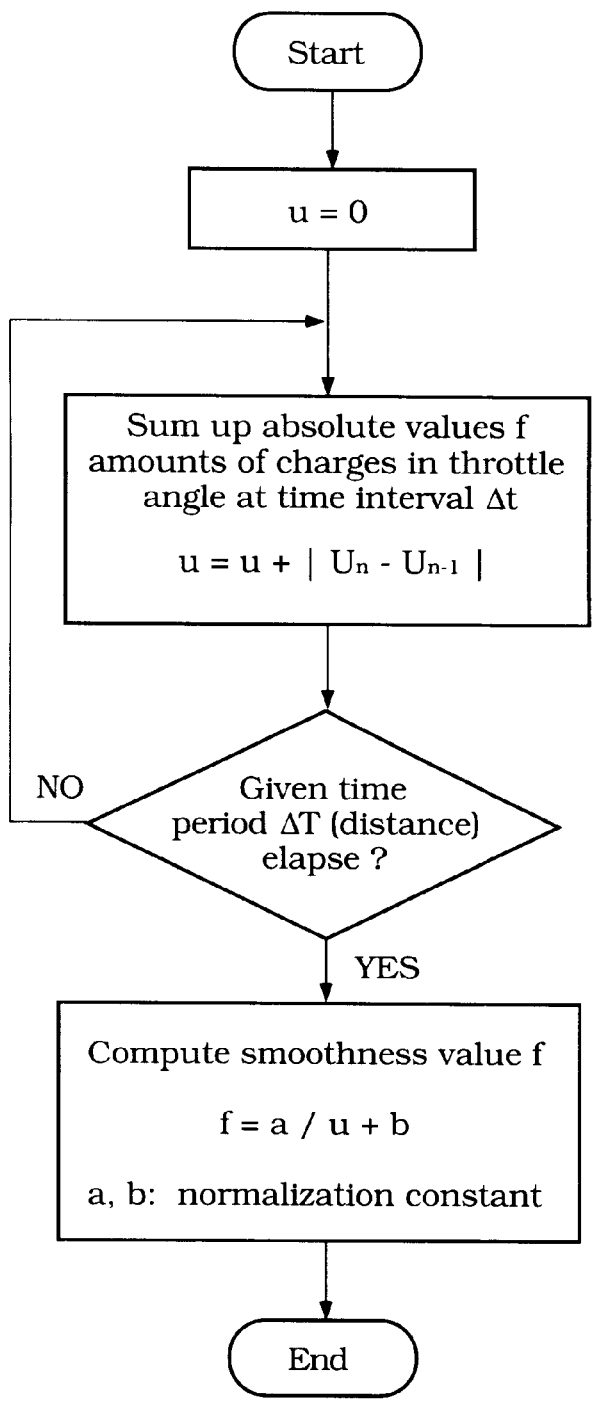
FIG. 18 is a flow chart showing one example of processing of computing "smoothness value f" for each individual.
Figure 19:
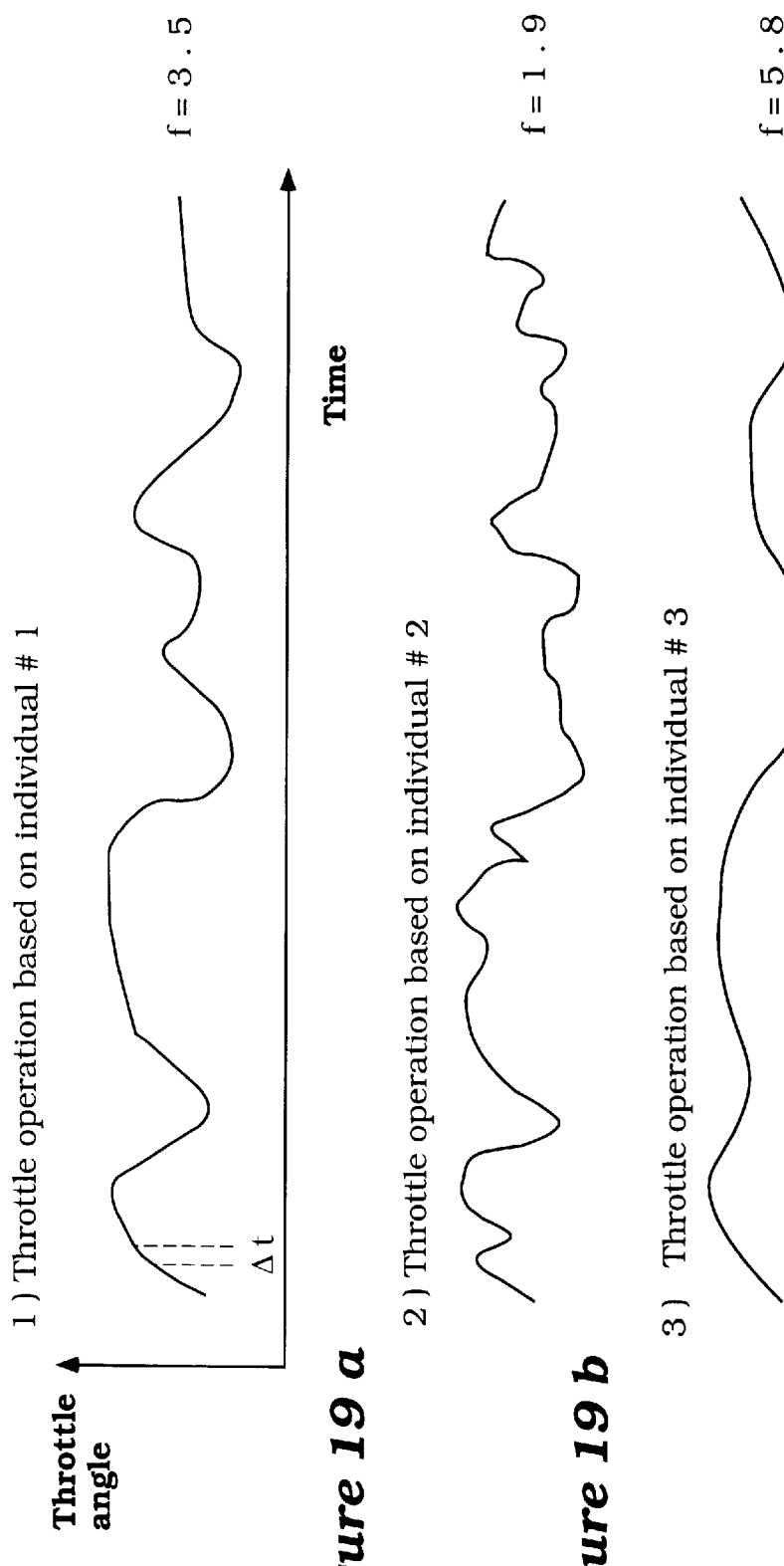

FIG. 17 is a conceptional diagram showing the relationship between the change in throttle angle and the smoothness value f for computing smoothness value f as an operation characteristic. FIG. 18 is a flow chart showing one example of processing of computing "smoothness value f" for each individual.

As shown in the figures, throttle angle signals (i.e., the state of the throttle controlled by the user) for a given time period ΔT during which each individual is used for control, are inputted as an operation characteristic to the evaluation system. During period ΔT, every predetermined time interval Δt, i.e., from time Un−1 to time Un, absolute values of the change in throttle angle are cumulatively added, and the total value is normalized. Smoothness value f is determined as follows:

$$F=(a/(\Sigma|Un-Un-1|))+b \quad (2)$$

wherein a and b are normalization constants.

Step 3: Selection Based On Smoothness Value f

FIGS. 19a, 19b, and 19c are schematic diagrams showing examples of smoothness values measured based on changes in throttle angle with time, wherein FIGS. 19a, 19b, and 19c illustrate the states of the throttle operated by the user when individuals #1, #2, and #3 are adopted, respectively. Smoothness value f determined by equation (2) becomes lower when the throttle is made to open and close frequently in a short time period (see FIGS. 19a and 19b), and becomes higher when the throttle is not made to open and close frequently in a short time period (see FIG. 19c). That is, the higher the smoothness value f, the smoother the operation by the user becomes, and the lower the smoothness value f, the less smooth the operation by the user becomes. If the user is satisfied with the engine performance at the moment, the user is expected to not change the throttle frequently. On the other hand, if the user is not satisfied with the engine performance at the moment, the user is expected to frequently change the throttle to try to obtain satisfactory performance. Thus, smoothness value f is expected to correlate to the degree of satisfaction with control performance when each individual is adopted.

Figure 20:
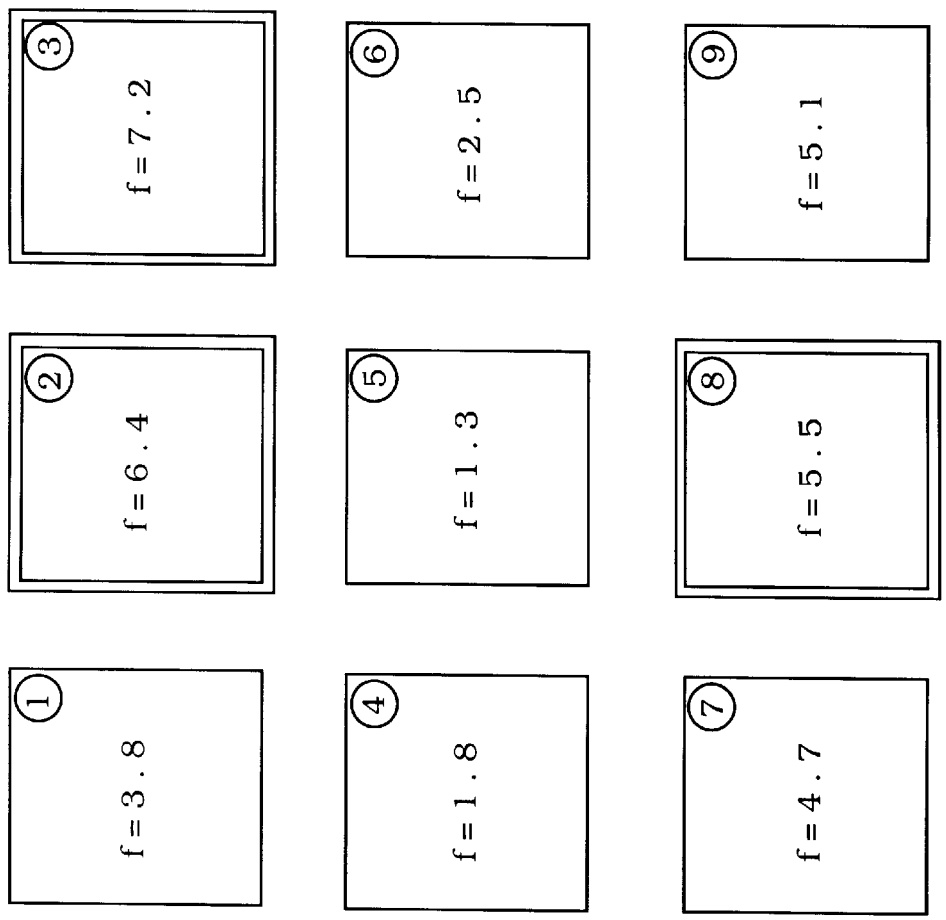
FIG. 20 is a diagram showing an example of selection of individuals based on smoothness value f, wherein individuals #2, #3, and #8 are selected as parent individuals for the next generation.

Accordingly, as indicated in FIG. 20, after completion of computation of smoothness value f for all of the individuals, a predetermined number of individuals (e.g., three individuals in FIG. 20) are selected in order of the value of smoothness value f as parent individuals for the next generation, and the other individuals are screened out. FIG. 20 is a diagram showing an example of selection of individuals based on smoothness value f, wherein individuals #2, #3, and #8 are selected as parent individuals for the next generation.

Step 4: Crossover

After completion of selection of parent individuals based on smoothness value f, the next generation again consisting of nine individuals is generated by using crossover processing of the selected parent individuals.

Step 5: Mutation

After the creation of the nine offspring individuals, mutation of genes is caused in the nine created offspring by randomly changing the gene value (the degree of coupling) at a given probability.

Step 6: Learning and Preservation

Steps 2 to 6 are repeated until an individual, which has the characteristics satisfying the user, is selected or until the evolution processing is repeated at predetermined times. The user terminates the evolution process by designating the individual, which has the highest smoothness value f, as the most preferable individual. After selection of the most preferable individual, the evolution-fitness layer fixes the coupling coefficients of the neural network at those of the most preferable individual. After the neural network is fixed at the most preferable individual, the evolution-fitness layer conducts control based on the evolution compensation for, for example, the actual engine speed outputted from the neural network. Upon activating control based on the evolution compensation by the evolution-fitness layer, the neural network for learning of the learning layer undergoes learning the relationship between the input and output of the evolution-fitness layer, in combination with the relationship between the input and output of the neural network functioning as a neural network for operation.

In the above, the smoothness value f is the value calculated based on the state of throttle operation by the user, i.e., the value is expected to correlate to the degree of the user's satisfaction. Thus, selection based on smoothness value f is equivalent to selection based on the user's presumed intention. If the evolution process in the evolution-fitness system is conducted based on smoothness value f, finally, the evolution-fitness layer is stabilized after being autonomously evolved to the characteristics corresponding to the user's preference.

As described above, by autonomously evolving the evolution-fitness layer by presuming the user's intention, operation troublesome for the user in evaluating individuals for selection by oneself due to direct input of the user's intention to the control system as described in the first embodiment, can be eliminated.

Overall Features and Other Embodiments

In the above, in the first embodiment, selection of individuals based on the user's intention indicated by the user's direct command or indication is explained with reference to FIGS. 2–14 when applied to the engine control. In the second embodiment, selection of individuals based on the user's presumed intention is explained with reference to FIGS. 15–20 when applied to the engine control. However, methods of selecting individuals based on the user's intention are not limited to these embodiments. For example, a combination of the user's expressed intention and the user's presumed intention can be used for selection of individuals. Further, a simulation can be used to select individuals over several generations, and the simulated outcome can be used. FIGS. 21a, 21b, 21c, and 21d are conceptional flow charts showing methods of selecting individuals including the first embodiment (FIG. 21a) and the second embodiment (FIG. 21b) and others.

Figure 21A:
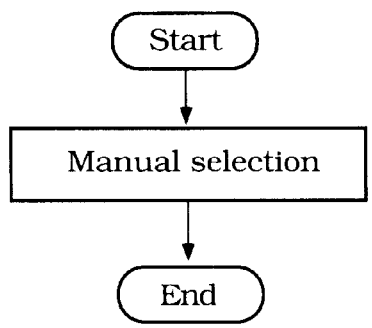
FIGS. 21a, 21b, 21c, and 21d are conceptional flow charts showing methods of selecting individuals including the first embodiment (FIG. 21a) and the second embodiment (FIG. 21b) described later.
Figure 21B:
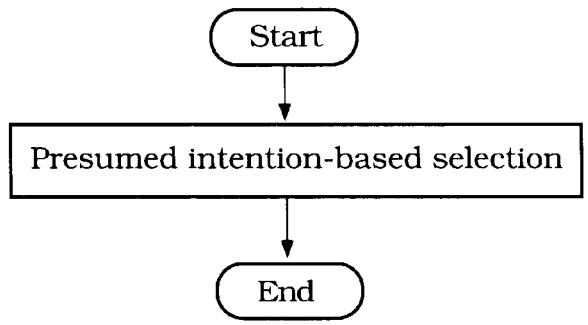
Figure 21C:
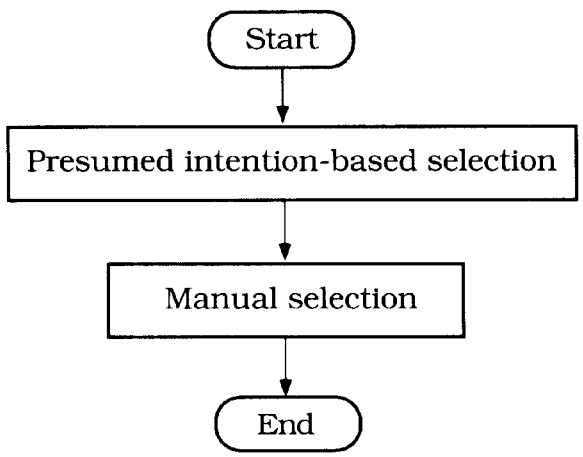

In FIG. 21c, for the first several generations, selection of individuals is conducted based on the user's presumed intention, and thereafter, selection is conducted manually by the user. In this example, the number of generations subjected to selection based on the user's presumed intention and the number of generations subjected to selection based on the user's manual operation can be balanced at the user's choice. Because selection based on the user's presumed intention takes place first so as to roughly direct a direction of evolution, and thereafter the user adjusts or sets a direction of evolution manually or makes the final decision of evolution, selection can be achieved in accordance with the user's intention without imposing considerable trouble on the user, i.e., while reducing the bother of manual selection by the user. Alternatively, manual selection by the user can be conducted over the first several generations so as to roughly direct a direction of evolution, and thereafter, selection based on the user's presumed intention can be conducted (not shown in the figures). In this case, because the user can roughly direct a direction of evolution first, the number of generations, which pass until evolution is settled, can be reduced. A set of selections based on the user's presumed intention and manual selection by the user can be repeated as necessary at appropriate times.

Figure 21D:
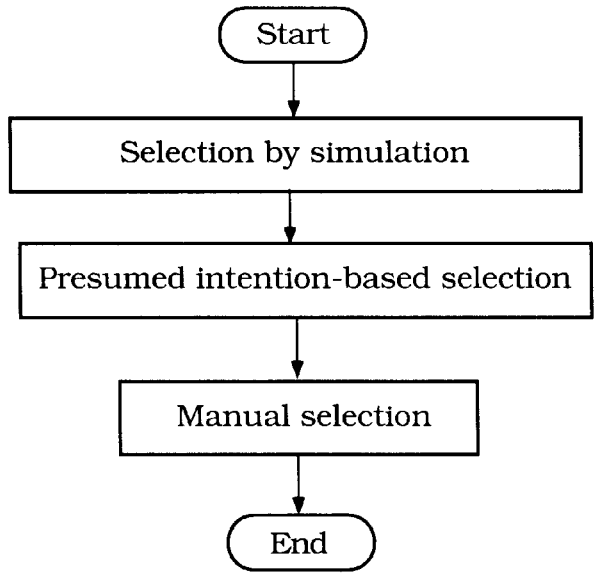

In FIG. 21d, selection is conducted over several generations in advance by using a simulator. Subsequently, selection based on the user's presumed intention is conducted over several generations, and thereafter, manual selection by the user's direct command is conducted. In this example, because selection by a simulator is conducted in advance over several generations so as to advance evolution to a certain extent before initiating selection based on the user's presumed intention, it is possible to eliminate the occurrence of individuals which have extreme characteristics departing from the user's intention while the subject is actually operating based on individuals. If manual selection by the user or selection based on the user's presumed intention is conducted first, the user must go through more generations to settle evolution because characteristics (chromosomes) are assigned to individuals at random. In the above example, due to the use of a simulator, the user's role in selection can be reduced. Further, because selection is conducted first by using a simulator, second based on the user's presumed intention, and last by manual operation, the most suitable evolution which most represents the user's intention can be achieved while minimizing manual operation by the user. Alternatively, manual selection by the user can be conducted without conducting selection based on the user's presumed intention, after selection by a simulator (not shown in the figures). In addition, after selection by a simulator, selection based on the user's presumed intention can solely be conducted so as to settle evolution.

As described above, manual selection, presumed intention-based selection, and selection by a simulator can be used singly or in any combination, and such a combination is not limited to those shown in FIGS. 21a, 21b, 21c, and 21d.

Further, in the present invention, correlations between various inputs and various outputs of the control system can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—"Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

OTHER APPLICATIONS

In the aforesaid example, the subject of the evolutionary control system is an engine for a vehicle. However, the subject of the evolutionary control system is not limited to an engine, and can be any given control such as control over the characteristics of a damper of a suspension or sheat for a vehicle, or control over the assist characteristics of an auxiliary drive of a bicycle or wheelchair equipped with an electric motor or engine, or control over the behavioral characteristics of a personal robot (brisk behavior or tranquil behavior).

Further, in the aforesaid example, as control output, the injection time period, the ignition timing, and the timing of intake valving are used. However, in addition to the above, control output for controlling an engine can be the degree of the electric throttle opening, the timing of activation of intake and exhaust valves, the degree of valve lift, the timing of activation of intake and exhaust control valves, or the like (see FIG. 4). In the above, the intake control valve is a valve provided in an intake pipe in order to control a and swirl. The exhaust control valve is a valve provided in an exhaust pipe in order to control exhaust pulsation.

Further, in the aforesaid example, the leanring layer is comprised of a hierarchical neural network. However, the basic structure of the control system of the learning layer is not limited to the above, and for example, a CMAC (Cerebellar Model Arithmetic Computer) can be used. The CMAC is excellent in terms of additional learning and the high speed of learning, as compared with the hierarchical neural network.

Further, in the second embodiment, as a state of operation, a throttle angle is used, and smoothness value f is computed as operation characteristic based on the throttle angle. However, information about the state of operation for obtaining the operation characteristic of the user is not limited to the above embodiment, and various information can be used depending on the type of an object to which the evolutionary control system of the present invention is adapted. For example, such information includes that related to the following operation means:

(1) Application to a vehicle:
   A throttle grip (accelerator pedal), brake bar (pedal), clutch bar (pedal), handle, steering wheel, and/or transmission.
(2) Application to a bicycle having an auxiliary electric motor or engine:
   A pedal, brake bar, handle, and/or transmission.
(3) Application to an electric wheel chair:
   A joy stick (a helper's operation of the wheel chair when in a helper mode).

(4) Application to a wheel chair having an auxiliary propelling device:
An operation ring provided on each wheel.
(5) Application to an outboard motor:
A throttle lever, and/or handle.
(6) Application to a water vehicle:
A throttle grip, and/or handle.
(7) Application to an unmanned helicopter:
A joy stick.
(8) Application to a personal robot:
Various switches, and/or voice.

Further, in the second embodiment, smoothness values, which represent operation characteristics of the user, are used as operation characteristics. However, operation characteristics are not limited to the above embodiment, and can be any characteristics, such as jerkiness, which change in accordance with or proportionally to the user's intention.

Although this invention has been described in terms of a certain embodiment, other embodiments apparent to those of ordinary skill in the art also are within the scope of this invention. Accordingly, the scope of the invention is intended to be defined only by the claims that follow.

Of course, the foregoing description is that of preferred embodiments of the invention, and various changes and modifications may be made without departing from the spirit and scope of the invention, as defined by the appended claims.

What is claimed is:

1. A method for controlling performance of a machine used by a user, which machine is operable by causative signals, the performance of which machine is indicatable by indicative signals, said machine being controlled by a control system comprising:

a control module programmed to output the causative signals when receiving per-selected signals, wherein the input-output relationship of the control module is regulated by coefficients; and a genetic algorithm unit programmed to select fitted coefficients based a selection signal when using coefficients as genes, wherein the selected fitted coefficients replace the coefficients used in the control module to update its input-output relationship;

said method comprising the steps of:

(a) outputting the causative signals from the control module to the machine when the control module receives per-selected signals;

(b) selecting a selection signal from the group consisting of: (i) a selection signal inputted directly by the user in response to the performance of the machine based on its indicative signals; (ii) a selection signal expressed numerically by analyzing the user's reaction to the performance of the machine based on its indicative signals; and (iii) a pre-set target value;

(c) selecting fitted coefficients by the genetic algorithm unit based on the selected selection signal; and (d) replacing the coefficients used in the control module to update its input-output relationship to control the machine.

2. The method according to claim 1, further comprising, prior to step (a), inputting the causative signals from the control module to a computer simulation model by bypassing the machine, said simulation model programmed to simulate the performance of the machine, wherein steps (a) through (d) are conducted using the simulation model.

3. The method according to claim 1, wherein the control module includes a neural network, the input-output relationship of which is regulated by coupling coefficients, said coupling coefficients being used as genes at the genetic algorithm units.

4. The method according to claim 1, wherein the control module constitutes an evolution layer, and the control system further comprises a base layer downstream of the evolution layer and upstream of the machine, said method further comprising calculating and adding, by the base layer, base values of the causative signals to the outputs from the control modules of the evolution layer, based on pre-selected signals.

5. The method according to claim 4 further comprising a learning layer between the evolution layer and the base layer, said learning layer having a learning function which copies the input-output relationship of the control module, said method further comprising copying the input-output relationship of the control module and outputting causative signals to the base layer.

6. The method according to claim 1, wherein the user's direct selection is conducted by using an indication monitor which indicates the performance of the machine, wherein the user selects preferable performance indicated on the monitor.

7. The method according to claim 1, wherein the user reaction is analyzed based on a change in operational action by the user in a pre-set time period.

* * * * *